(12) United States Patent
Strongin et al.

(10) Patent No.: US 6,854,039 B1
(45) Date of Patent: Feb. 8, 2005

(54) MEMORY MANAGEMENT SYSTEM AND METHOD PROVIDING INCREASED MEMORY ACCESS SECURITY

(75) Inventors: Geoffrey S. Strongin, Austin, TX (US); Brian C. Barnes, Round Rock, TX (US); Rodney W. Schmidt, Dripping Springs, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 315 days.

(21) Appl. No.: 10/005,271

(22) Filed: Dec. 5, 2001

(51) Int. Cl.$^7$ .............................................. G06F 12/00
(52) U.S. Cl. ........................ 711/163; 711/145; 711/150; 711/152; 711/154; 713/161; 713/166
(58) Field of Search ................................ 711/145, 163, 711/154, 152; 713/161, 166, 200

(56) References Cited

U.S. PATENT DOCUMENTS

| | | | | | |
|---|---|---|---|---|---|
| 4,809,160 | A | * | 2/1989 | Mahon et al. ............... | 713/200 |
| 4,926,322 | A | * | 5/1990 | Stimac et al. ................ | 703/23 |
| 5,048,085 | A | * | 9/1991 | Abraham et al. ............. | 380/23 |
| 5,173,872 | A | * | 12/1992 | Crawford et al. ............. | 365/49 |
| 5,765,206 | A | * | 6/1998 | Hohensee et al. ............ | 711/203 |
| 5,802,275 | A | * | 9/1998 | Blonder ....................... | 713/200 |
| 5,881,225 | A | * | 3/1999 | Worth .......................... | 713/200 |
| 5,983,370 | A | * | 11/1999 | Anderson ..................... | 714/49 |
| 6,047,354 | A | * | 4/2000 | Yoshioka et al. ............. | 711/118 |
| 6,289,462 | B1 | * | 9/2001 | McNabb et al. .............. | 713/201 |
| 6,435,416 | B1 | * | 8/2002 | Slassi ........................... | 235/492 |
| 6,516,395 | B1 | * | 2/2003 | Christie ....................... | 711/163 |
| 2003/0014667 | A1 | * | 1/2003 | Kolichtchak ................. | 713/201 |
| 2003/0084256 | A1 | * | 5/2003 | McKee ........................ | 711/152 |
| 2003/0115476 | A1 | * | 6/2003 | McKee ........................ | 713/193 |

* cited by examiner

Primary Examiner—Ngoc Dinh
(74) Attorney, Agent, or Firm—Williams, Morgan & Amerson

(57) ABSTRACT

A memory management unit (MMU) is disclosed for managing a memory storing data arranged within a multiple memory pages. The memory management unit includes a security check receiving a physical address within a selected memory page, and security attributes of the selected memory page. The security check unit uses the physical address to access one or more security attribute data structures located in the memory to obtain an additional security attribute of the selected memory page. The security check unit generates a fault signal dependent upon the security attributes of selected memory page and the additional security attribute of the selected memory page. The security attributes of the selected memory page may include a user/supervisor (U/S) bit and a read/write (R/W) bit as defined by the x86 processor architecture. The one or more security attribute data structures may include a security attribute table directory and one or more security attribute tables. The security attribute table directory may include multiple entries, and each entry of the security attribute table directory may include a present bit and a security attribute table base address field. A central processing unit (CPU) is described including the memory management unit (MMU), and a computer system is disclosed including the CPU. A method is described for providing access security for a memory used to store data arranged within multiple memory pages.

49 Claims, 13 Drawing Sheets

PAGE DIRECTORY ENTRY FORMAT 200:

PAGE TABLE ENTRY FORMAT 300:

TO HOST BRIDGE 404

MEMORY MANAGEMENT SYSTEM AND METHOD PROVIDING INCREASED MEMORY ACCESS SECURITY

BACKGROUND OF THE INVENTION

1. References

This patent application is related to a co-pending patent application serial no. 10/011,151 entitled "System and Method for Handling Device Accesses to a Memory Providing Increased Memory Access Security" by Geoffrey S. Strongin, Brian C. Barnes, and Rodney W. Schmidt, filed on the same day as the present patent application.

2. Field of the Invention

This invention relates generally to memory management systems and methods, and, more particularly, to memory management systems and methods that provide protection for data stored within a memory.

3. Description of the Related Art

A typical computer system includes a memory hierarchy to obtain a relatively high level of performance at relatively low cost. Instructions of several different software programs are typically stored on a relatively large but slow non-volatile storage unit (e.g., a disk drive unit). When a user selects one of the programs for execution, the instructions of the selected program are copied into a main memory unit (e.g., random access memory (RAM)), and a central processing unit (CPU) obtains the instructions of the selected program from the main memory unit. A well-known virtual memory management technique allows the CPU to access data structures larger in size than that of the main memory unit by storing only a portion of the data structures within the main memory unit at any given time. Remainders of the data structures are stored within the relatively large but slow non-volatile storage unit, and are copied into the main memory unit only when needed.

Virtual memory is typically implemented by dividing an address space of the CPU into multiple blocks called page frames or "pages." Only data corresponding to a portion of the pages is stored within the main memory unit at any given time. When the CPU generates an address within a given page, and a copy of that page is not located within the main memory unit, the required page of data is copied from the relatively large but slow non-volatile storage unit into the main memory unit. In the process, another page of data may be copied from the main memory unit to the non-volatile storage unit to make room for the required page.

The popular 80×86 (×86) processor architecture includes specialized hardware elements to support a protected virtual address mode (i.e., a protected mode). FIGS. 1–3 will now be used to describe how an ×86 processor implements both virtual memory and memory protection features. FIG. 1 is a diagram of a well-known linear-to-physical address translation mechanism 100 of the ×86 processor architecture. An address translation mechanism 100 is embodied within an ×86 processor, and involves a linear address 102 produced within the ×86 processor, a page table directory (i.e., a page directory) 104, multiple page tables including a page table 106, multiple page frames including a page frame 108, and a control register (CR3) 110. The page directory 104 and the multiple page tables are paged memory data structures created and maintained by operating system software (i.e., an operating system). The page directory 104 is always located within the memory (e.g., the main memory unit). For simplicity, the page table 106 and the page frame 108 will also be assumed to reside in the memory.

As indicated in FIG. 1, the linear address 102 is divided into three portions to accomplish the linear-to-physical address translation. The highest ordered bits of the CR3 110 are used to store a page directory base register. The page directory base register is a base address of a memory page containing the page directory 104. The page directory 104 includes multiple page directory entries, including a page directory entry 112. An upper "directory index" portion of the linear address 102, including the highest ordered or most significant bits of the linear address 102, is used as an index into the page directory 104. The page directory entry 112 is selected from within the page directory 104 using the page directory base address of the CR3 110 and the upper "directory index" portion of the linear address 102.

FIG. 2 is a diagram of a page directory entry format 200 of the ×86 processor architecture. As indicated in FIG. 2, the highest ordered (i.e., most significant) bits of a given page directory entry contain a page table base address, where the page table base address is a base address of a memory page containing a corresponding page table. The page table base address of the page directory entry 112 is used to select the corresponding page table 106.

Referring back to FIG. 1, the page table 106 includes multiple page table entries, including a page table entry 114. A middle "table index" portion of the linear address 102 is used as an index into the page table 106, thereby selecting the page table entry 114. FIG. 3 is a diagram of a page table entry format 300 of the ×86 processor architecture. As indicated in FIG. 3, the highest ordered (i.e., most significant) bits of a given page table entry contain a page frame base address, where the page frame base address is a base address of a corresponding page flame.

Referring again to FIG. 1, the page frame base address of the page table entry 114 is used to select the corresponding page frame 108. The page frame 108 includes multiple memory locations. A lower or "offset" portion of the linear address 102 is used as an index into the page frame 108. When combined, the page frame base address of the page table entry 114 and the offset portion of the linear address 102 produce the physical address corresponding to the linear address 102, and indicate a memory location 116 within the page frame 108. The memory location 116 has the physical address resulting from the linear-to-physical address translation.

Regarding the memory protection features, the page directory entry format 200 of FIG. 2 and the page table entry format 300 of FIG. 3 include a user/supervisor (U/S) bit and a read/write (R/W) bit. The contents of the U/S and R/W bits are used by the operating system to protect corresponding page frames (i.e., memory pages) from unauthorized access. U/S=0 is used to denote operating system memory pages, and corresponds to a "supervisor" level of the operating system. The supervisor level of the operating system corresponds to a current privilege level 0 (CPL0) of software programs and routines executed by the ×86 processor. U/S>0 (e.g., U/S=1, 2, or 3) is used to indicate user memory pages, and corresponds to a "user" level of the operating system.

The R/W bit is used to indicate types of accesses allowed to the corresponding memory page. R/W=0 indicates the only read accesses are allowed to the corresponding memory page (i.e., the corresponding memory page is "read-only"). R/W=1 indicates that both read and write accesses are allowed to the corresponding memory page (i.e., the corresponding memory page is "read-write").

During the linear-to-physical address translation operation of FIG. 1, the contents of the U/S bits of the page directory entry 112 and the page table entry 114, corresponding to the page frame 108, are logically ANDed to determine if the access to the page frame 108 is authorized. Similarly, the contents of the R/W bits of the page directory entry 112 and the page table entry 114 are logically ANDed to determine if the access to the page frame 108 is authorized. If the logical combinations of the U/S and R/W bits indicate the access to the page frame 108 is authorized, the memory location 116 is accessed using the physical address. On the other hand, if the logical combinations of the U/S and R/W bits indicate that the access to the page frame 108 is not authorized, the memory location 116 is not accessed, and a protection fault indication is signaled.

Unfortunately, the above described memory protection mechanisms of the x86 processor architecture are not sufficient to protect data stored in the memory. For example, any software program or routine executing at the supervisor level (e.g., having a CPL of 0) can access any portion of the memory, and can modify (i.e., write to) any portion of the memory that is not marked "read-only" (R/W=0). In addition, by virtue of executing at the supervisor level, the software program or routine can change the attributes (i.e., the U/S and R/W bits) of any portion of the memory. The software program or routine can thus change any portion of the memory marked "read-only" to "read-write" (R/W=1), and then proceed to modify that portion of the memory.

The protection mechanisms of the x86 processor architecture are also inadequate to prevent errant or malicious accesses to the memory by hardware devices operably coupled to the memory. It is true that portions of the memory marked "read-only" cannot be modified U/S=1 indicates the selected memory page is a user memory page and corresponds to a user level of the operating system. R/W=0 indicates only read accesses are allowed to the selected memory page, and R/W=1 indicates that both read and write accesses are allowed to the selected memory page.

The one or more security attribute data structures may include a security attribute table directory and one or more security attribute tables. The security attribute table directory may include multiple entries, and each entry of the security attribute table directory may include a present bit and a security attribute table base address field. The present bit may indicate whether or not a security attribute table corresponding to the security attribute table directory entry is present in the memory. The security attribute table base address field may be reserved for a base address of the security attribute table corresponding to the security attribute table directory entry.

The one or more security attribute tables may include multiple entries. Each entry of the security attribute table may include, for example, a secure page (SP) bit indicating whether or not a corresponding memory page is a secure page. The additional security attribute of the selected memory page may include a secure page (SP) bit indicating whether or not the selected memory page is a secure page.

The linear address may be produced during execution of an instruction residing within a first memory page. The security check unit may be coupled to receive a current privilege level (CPL) of a task including the instruction. The security check logic may obtain an additional security attribute of the first memory page from the one or more security attribute data structures. The security check logic may generate the fault signal dependent upon the by write accesses initiated by hardware devices (without the attributes of those portions of the memory first being changed as described above). It is also true that software programs or routines (e.g., device drivers) handling data transfers between hardware devices and the memory typically execute at the user level (e.g., CPL3), and are not permitted access to portions of the memory marked as supervisor level (U/S=0). However, the protection mechanisms of the x86 processor architecture cover only device accesses to the memory performed as a result of instruction execution (i.e., programmed input/output). A device driver can program a hardware device having bus mastering or DMA capability to transfer data from the device into any portion of the memory accessible by the hardware device. For example, it is relatively straightforward to program a floppy disk controller to transfer data from a floppy disk directly into a portion of the memory used to store the operating system.

SUMMARY OF THE INVENTION

A memory management unit (MMU) is disclosed for managing a memory storing data arranged within a multiple memory pages. The memory management unit includes a security check unit receiving a physical address within a selected memory page, and security attributes of the selected memory page. The security check unit uses the physical address to access one or more security attribute data structures located in the memory to obtain an additional security attribute of the selected memory page. The security check unit generates a fault signal dependent upon the security attributes of selected memory page and the additional security attribute of the selected memory page.

The security attributes of the selected memory page may include, for example, a user/supervisor (U/S) bit and a read/write (R/W) bit as defined by the x86 processor architecture. In this situation, U/S=0 indicates the selected memory page is an operating system memory page and corresponds to a supervisor level of the operating system, and CPL of the task including the instruction, the additional security attribute of the first memory page, the security attributes of the selected memory page, and the additional security attribute of the selected memory page. The additional security attribute of the first memory page may include a secure page (SP) bit indicating whether or not the first memory page is a secure page. The fault signal may be a page fault signal as defined by the x86 processor architecture.

A central processing unit (CPU) is described including an execution unit and the above described memory management unit (MMU). The execution unit is coupled to a memory, and fetches instructions from the memory and executes the instructions. A computer system is disclosed including a memory for storing data including instructions, a central processing unit (CPU) including an execution unit coupled to the memory, and the above described memory management unit (MMU). The execution unit fetches instructions from the memory and executes the instructions.

A memory management unit is disclosed for managing a memory storing data arranged within a multiple memory pages. The memory management unit includes a paging unit coupled to the memory and to receive a linear address. The memory management unit is configured to use the linear address to produce a physical address within a selected memory page. The paging unit uses the linear address to access one or more paged memory data structures located in the memory to obtain security attributes of the selected memory page. The paging unit produces a fault signal dependent upon the security attributes of the selected memory page.

The paging unit includes a security check unit coupled to receive the physical address and the security attributes of the selected memory page. The security check unit uses the physical address of the selected memory page to access one or more security attribute data structures located in the memory to obtain an additional security attribute of the selected memory page. The security check unit generates the fault signal dependent upon the security attributes of selected memory page and the additional security attribute of the selected memory page.

The paging unit may produce the physical address of the selected memory page during execution of an instruction residing within a first memory page. The physical address within the selected memory page may include a base address and an offset. The paging unit may obtain the base address from the one or more paged memory data structures. The one or more paged memory data structures may include, for example, a page directory and one or more page tables as defined by the x86 processor architecture. The security attributes of the selected memory page may include a user/supervisor (U/S) bit and a read/write (R/W) bit as defined by the x86 processor architecture.

The paging unit may receive a security attribute of the instruction, and may produce the fault signal dependent upon the security attribute of the instruction and the security attributes of the selected memory page. The security attribute of the instruction may include a current privilege level (CPL) of a task including the instruction as defined by the x86 processor architecture.

The one or more security attribute data structures may include a security attribute table directory and one or more security attribute tables. The security attribute table directory may include multiple entries, and each entry of the security attribute table directory may include a present bit and a security attribute table base address field. The present bit may indicate whether or not a security attribute table corresponding to the security attribute table directory entry is present in the memory. The security attribute table base address field may be reserved for a base address of the security attribute table corresponding to the security attribute table directory entry.

The one or more security attribute tables may include multiple entries, and each entry of the security attribute table may include a secure page (SP) bit indicating whether or not a corresponding memory page is a secure page. The additional security attribute of the selected memory page may include a secure page (SP) bit indicating whether or not the selected memory page is a secure page.

The security check unit may receive the CPL of the task including the instruction. The security check logic may obtain an additional security attribute of the first memory page including the instruction from the one or more security attribute data structures. The security check unit may generate the fault signal dependent upon the CPL of the task including the instruction, the additional security attribute of the first memory page including the instruction, the security attributes of the selected memory page, and the additional security attribute of the selected memory page. The additional security attribute of the first memory page may include a secure page (SP) bit indicating whether or not the first memory page is a secure page. The fault signal may be a page fault signal as defined by the x86 processor architecture.

A method is described for providing access security for a memory used to store data arranged within multiple memory pages. The method includes receiving a linear address produced during execution of an instruction and a security attribute of the instruction, wherein the instruction resides in a first memory page. The linear address is used to access one or more paged memory data structures located in the memory to obtain a base address of a selected memory page and security attributes of the selected memory page. If the security attribute of the instruction and the security attributes of the selected memory page indicate the access is authorized, the base address of the selected memory page is combined with an offset to produce a physical address within the selected memory page. A fault signal is generated if the security attribute of the instruction and the security attributes of the selected memory page indicate the access is not authorized.

One or more security attribute data structures, located in the memory, are accessed using the physical address of the selected memory page to obtain an additional security attribute of the first memory page and an additional security attribute of the selected memory page. The fault signal is generated dependent upon the security attribute of the instruction, the additional security attribute of the first memory page, the security attributes of the selected memory page, and the additional security attribute of the selected memory page.

The one or more paged memory data structures may include a page directory and one or more page tables as defined by the x86 processor architecture. The security attribute of the instruction may include a current privilege level (CPL) of a task including the instruction as defined by the x86 processor architecture. The security attributes of the selected memory page may include a user/supervisor (U/S) bit a read/write (R/W) bit as defined by the x86 processor architecture. The fault signal may be a page fault signal as defined by the x86 processor architecture.

The additional security attribute of the first memory page may include a secure page (SP) bit indicating whether or not the first memory page is a secure page. The additional security attribute of the selected memory page may also include a secure page (SP) bit indicating whether or not the selected memory page is a secure page. The one or more security attribute data structures may include a security attribute table directory and one or more security attribute tables.

BRIEF DESCRIPTION OF THE DRAWINGS

The invention may be understood by reference to the following description taken in conjunction with the accompanying drawings, in which like reference numerals identify similar elements, and in which.

Figure 1:
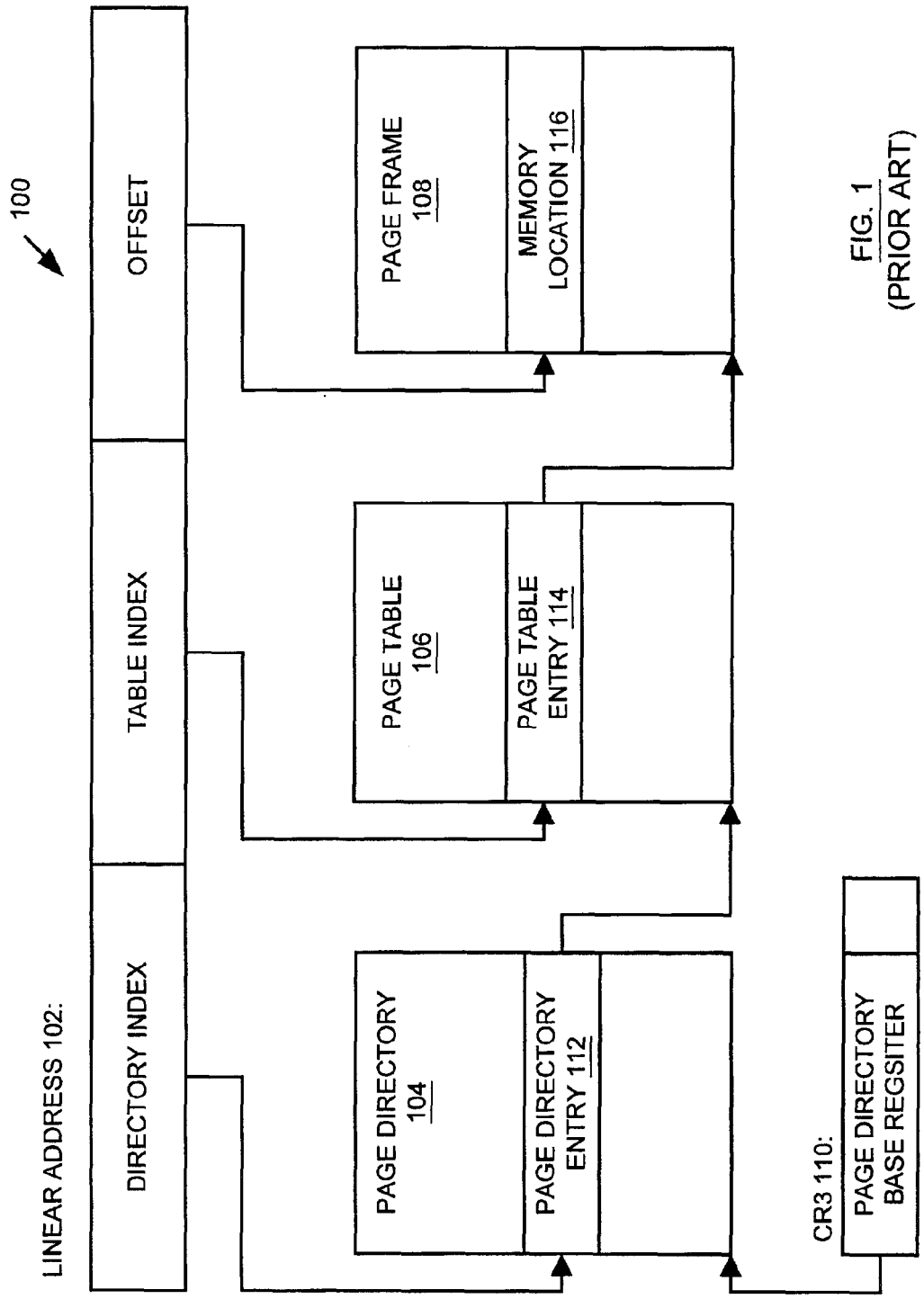
FIG. 1 is a diagram of a well-known linear-to-physical address translation mechanism of the x86 processor architecture.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a develop-ment effort might be complex and time-consuming, but would nevertheless be a routine undertaking for those of ordinary skill in the art having the benefit of this disclosure.

Figure 4:
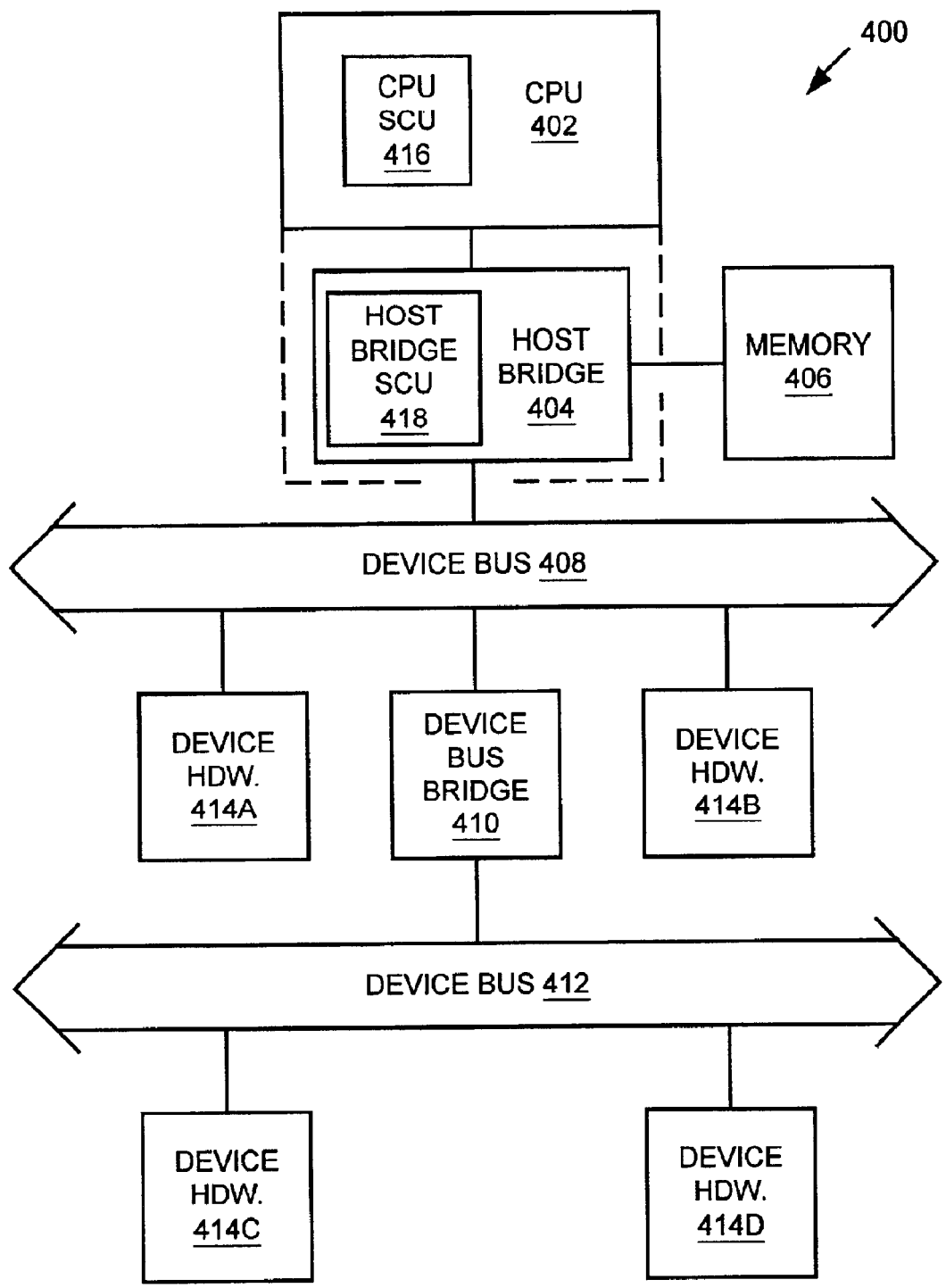
FIG. 4 is a diagram of one embodiment of a computer system including a CPU and a system or "host" bridge, wherein the CPU includes a CPU security check unit (SCU), and wherein the host bridge includes a host bridge SCU.

FIG. 4 is a diagram of one embodiment of a computer system 400 including a CPU 402, a system or "host" bridge 404, a memory 406, a first device bus 408 (e.g., a peripheral component interconnect or PCI bus), a device bus bridge 410, a second device bus 412 (e.g., an industry standard architecture or ISA bus), and four device hardware units 414A–414D. Host bridge 404 is coupled to CPU 402, memory 406, and device bus 408. Host bridge 404 translates signals between CPU 402 and device bus 408, and operably couples memory 406 to CPU 402 and to device bus 408. Device bus bridge 410 is coupled between device bus 408 and device bus 412, and translates signals between device bus 408 and device bus 412. In the embodiment of FIG. 4, device hardware units 414A and 414B are coupled to device bus 408, and device hardware units 414C and 414D are coupled to device bus 412. One or more of the device hardware units 414A–414D may be, for example, storage devices (e.g., hard disk drives, floppy drives, and CD-ROM drives), communication devices (e.g., modems and network adapters), or input/output devices (e.g., video devices, audio devices, and printers).

In the embodiment of FIG. 4, CPU 402 includes a CPU security check unit (SCU) 416, and host bridge 404 includes a host bridge SCU 418. As will be described in detail below, CPU SCU 416 protects memory 406 from unauthorized accesses generated by CPU 402 (i.e., "software-initiated accesses"), and host bridge SCU 418 protects memory 406 from unauthorized accesses initiated by device hardware units 414A–414D (i.e., "hardware-initiated accesses"). It is noted that in other embodiments, host bridge 404 may be part of CPU 402 as indicated in FIG. 4.

Figure 5:
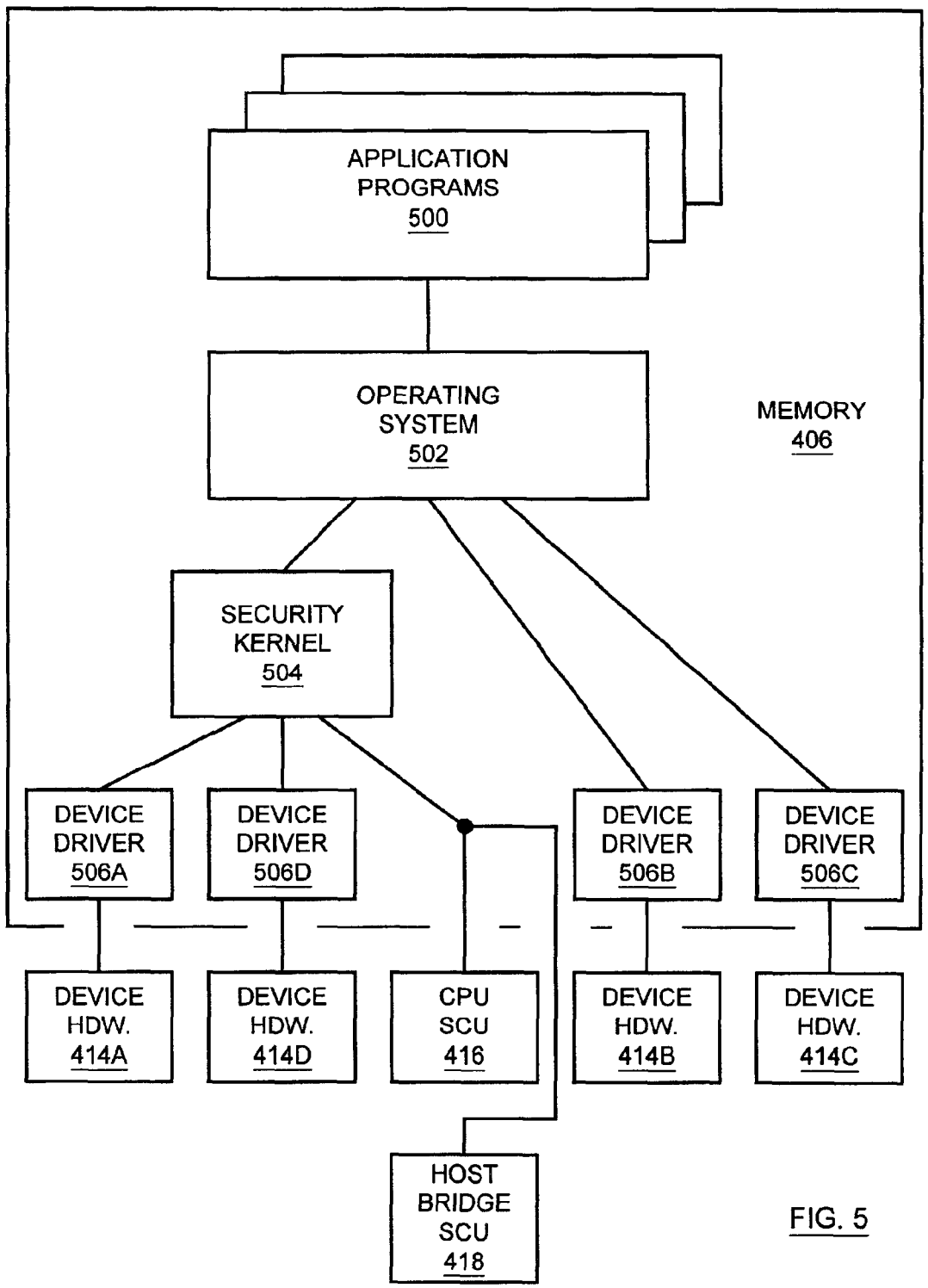
FIG. 5 is a diagram illustrating relationships between various hardware and software components of the computer system of FIG. 4.

FIG. 5 is a diagram illustrating relationships between various hardware and software components of computer system 400 of FIG. 4. In the embodiment of FIG. 5, multiple application programs 500, an operating system 502, a security kernel 504, and device drivers 506A–506D are stored in memory 406. Application programs 500, operating system 502, security kernel 504, and device drivers 506A–506D include instructions executed by CPU 402. Operating system 502 provides a user interface and software "platform" on top of which application programs 500 run. Operating system 502 may also provide, for example, basic support functions including file system management, process management, and input/output (I/O) control.

Operating system 502 may also provide basic security functions. For example, CPU 402 (FIG. 4) may be an x86 processor which executes instructions of the x86 instruction set. In this situation, CPU 402 may include specialized hardware elements to provide both virtual memory and memory protection features in the protected mode as described above. Operating system 502 may be, for example, one of the Windows® family of operating systems (Microsoft Corp., Redmond, Wash.) which operates CPU 402 in the protected mode, and uses the specialized hardware elements of CPU 402 to provide both virtual memory and memory protection in the protected mode.

As will be described in more detail below, security kernel 504 provides additional security functions above the security functions provided by operating system 502 to protect data stored in memory 406 from unauthorized access. In the embodiment of FIG. 5, device drivers 506A–506D are operationally associated with, and coupled to, respective corresponding device hardware units 414A–414D. Device hardware units 414A and 414D are "secure" devices, and corresponding device drivers 506A and 506D are "secure" device drivers. Security kernel 504 is coupled between operating system 502 and secure device drivers 506A and 506D, and monitors all accesses by application programs 500 and operating system 502 to secure device drivers 506A and 506D and corresponding secure devices 414A and 414D. Security kernel 504 prevents unauthorized accesses to secure device drivers 506A and 506D and corresponding secure devices 414A and 414D by application programs 500 and operating system 502.

As indicated in FIG. 5, security kernel 504 is coupled to CPU SCU 416 and host bridge SCU 418 (e.g., via one or more device drivers). As will be described in detail below, CPU SCU 416 and host bridge SCU 418 control accesses to memory 406. CPU SCU 416 monitors all software-initiated accesses to memory 406, and host bridge SCU 418 monitors all hardware-initiated accesses to memory 406. Once configured by security kernel 504, CPU SCU 416 and host bridge SCU 418 allow only authorized accesses to memory 406.

In the embodiment of FIG. 5, device drivers 506B and 506C are "non-secure" device drivers, and corresponding device hardware units 414B and 414C are "non-secure" device hardware units. Device drivers 506B and 506C and corresponding device hardware units 414B and 414C may be, for example, "legacy" device drivers and device hardware units.

It is noted that in other embodiments security kernel 504 may be part of operating system 502. In yet other embodiments, security kernel 504, device drivers 506A and 506D, and/or device drivers 506B and 506C may be part of operating system 502.

Figure 6:
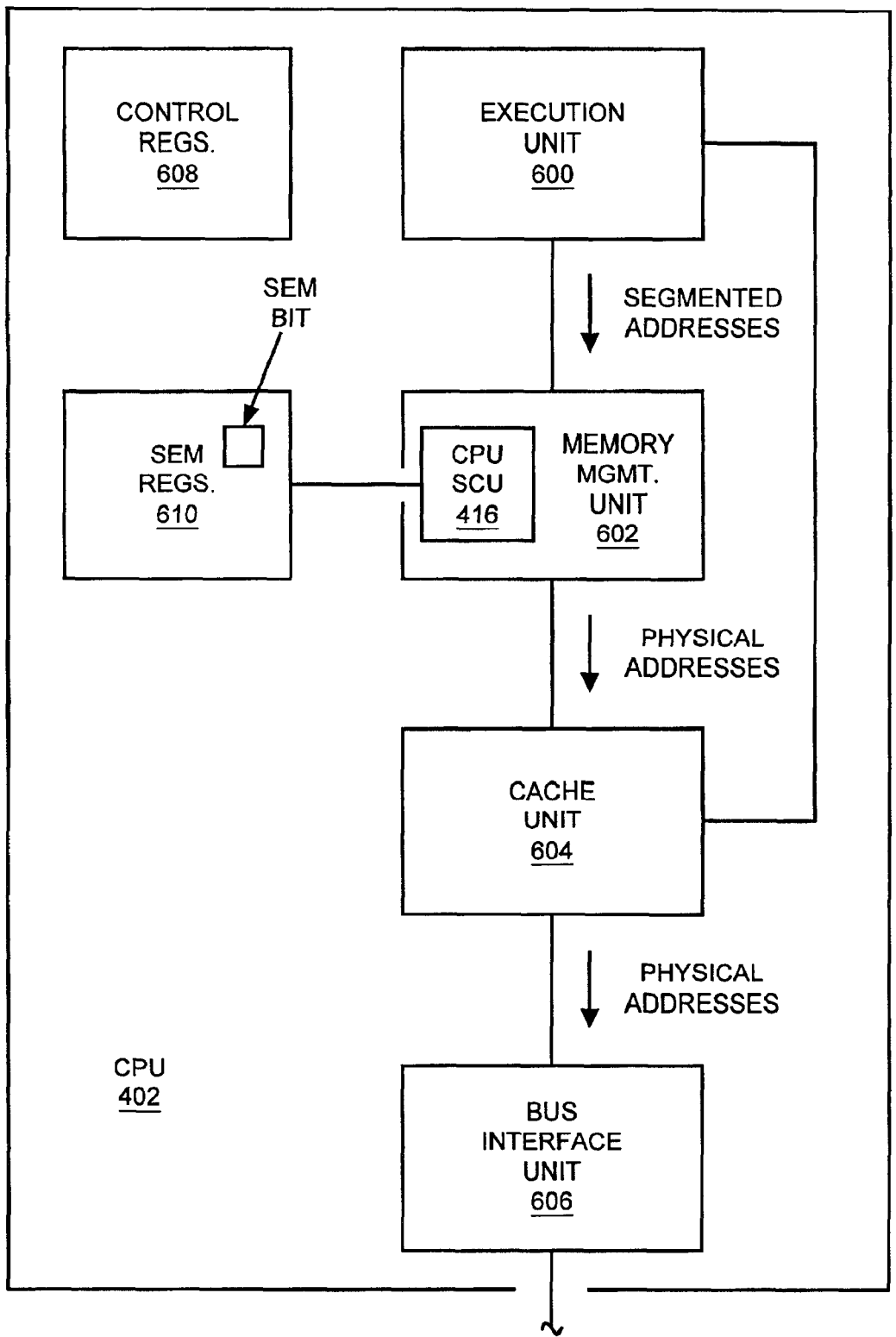
FIG. 6 is a diagram of one embodiment of the CPU of the computer system of FIG. 4, wherein the CPU includes a memory management unit (MMU)

FIG. 6 is a diagram of one embodiment of CPU 402 of computer system 400 of FIG. 4. In the embodiment of FIG. 6, CPU 402 includes an execution unit 600, a memory management unit (MMU) 602, a cache unit 604, a bus interface unit (BIU) 606, a set of control registers 608, and a set of secure execution mode (SEM) registers 610. CPU SCU 416 is located within MMU 602. As will be described in detail below, the set of SEM registers 610 are used to implement a secure execution mode (SEM) within computer system 400 of FIG. 4, and operations of CPU SCU 416 and host bridge SCU 418 are governed by the contents of the set of SEM registers 610. SEM registers 610 are accessed (i.e., written to and/or read from) by security kernel 504 (FIG. 5). Computer system 400 of FIG. 4 may, for example, operate in the SEM when: (i) CPU 402 is an x86 processor operating in the x86 protected mode, (ii) memory paging is enabled, and (iii) the contents of SEM registers 610 specify SEM operation.

In the embodiment of FIG. 6, the set of SEM registers 610 includes a secure execution mode (SEM) bit. Operating modes of the computer system 400 (FIG. 4) include a "normal execution mode" and a "secure execution mode" (SEM). The computer system 400 normally operates in the normal execution mode. The set of SEM registers 610 is used to implement the secure execution mode (SEM) within the computer system 400. The SEM registers 610 are accessed (i.e., written to and/or read from) by the security kernel 504 (FIG. 5). The computer system 400 may, for example, operate in the secure execution mode (SEM) when: (i) the CPU 402 (FIG. 4) is an x86 processor operating in the x86 protected mode, (ii) memory paging is enabled, and (iii) the secure execution mode (SEM) bit is set to '1'.

In general, the contents of the set of control registers 608 govern operation of CPU 402. Accordingly, the contents of the set of control registers 608 govern operation of execution unit 600, MMU 602, cache unit 604, and/or BIU 606. The set of control registers 608 may include, for example, the multiple control registers of the x86 processor architecture.

Execution unit 600 of CPU 402 fetches instructions (e.g., x86 instructions) and data, executes the fetched instructions, and generates signals (e.g., address, data, and control signals) during instruction execution. Execution unit 600 is coupled to cache unit 604, and may receive instructions from memory 406 (FIG. 4) via cache unit 604 and BIU 606.

Memory 406 (FIG. 4) of computer system 400 includes multiple memory locations, each having a unique physical address. When operating in protected mode with paging enabled, an address space of CPU 402 is divided into multiple blocks called page frames or "pages." As described above, only data corresponding to a portion of the pages is stored within memory 406 at any given time. In the embodiment of FIG. 6, address signals generated by execution unit 600 during instruction execution represent segmented (i.e., "logical") addresses. As described below, MMU 602 translates the segmented addresses generated by execution unit 600 to corresponding physical addresses of memory 406. MMU 602 provides the physical addresses to cache unit 604. Cache unit 604 is a relatively small storage unit used to store instructions and data recently fetched by execution unit 600. BIU 606 is coupled between cache unit 604 and host bridge 404, and is used to fetch instructions and data not present in cache unit 604 from memory 406 via host bridge 404.

Figure 7:
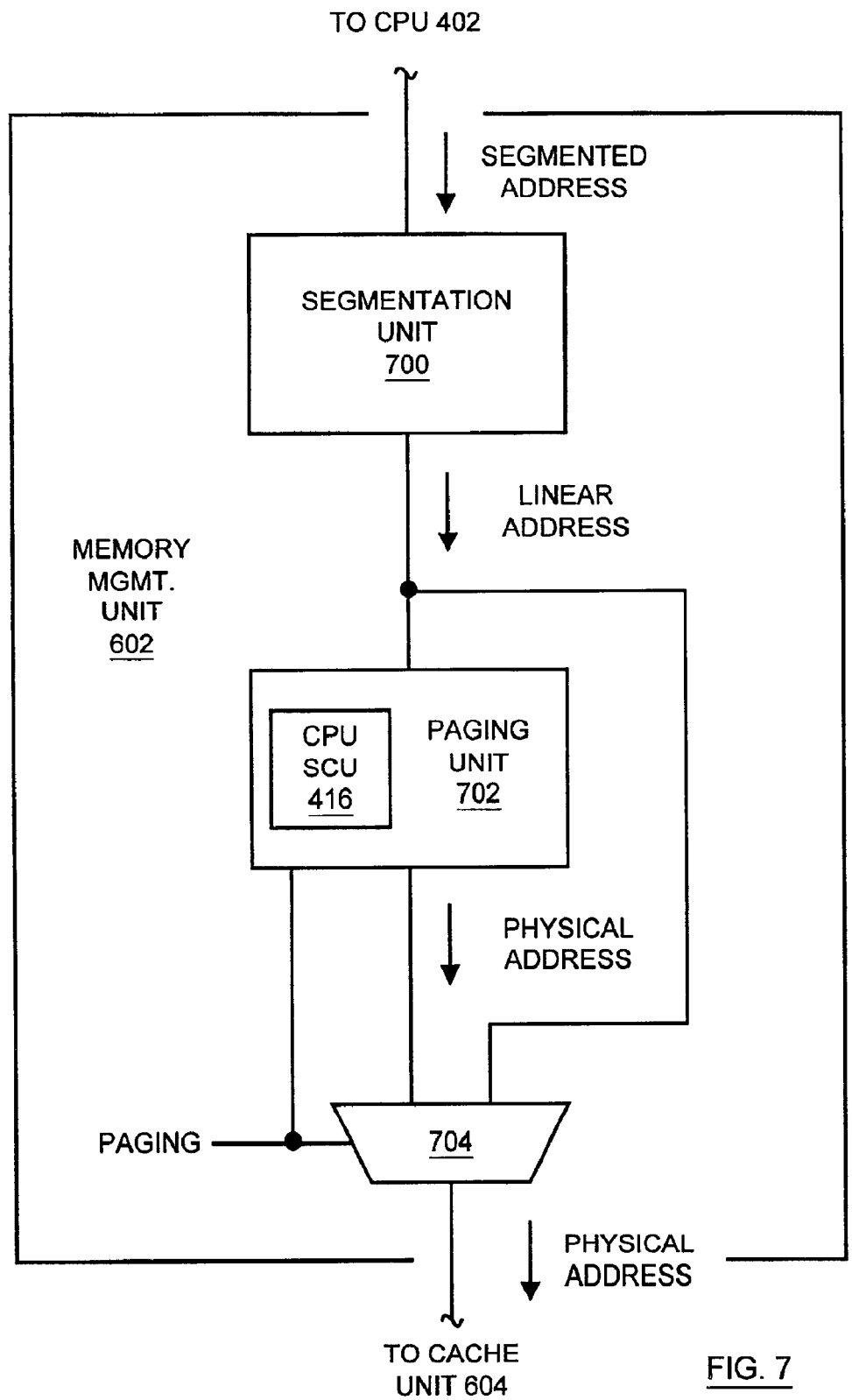
FIG. 7 is a diagram of one embodiment of the MMU of FIG. 6, wherein the MMU includes a paging unit, and wherein the paging unit includes the CPU SCU.

FIG. 7 is a diagram of one embodiment of MMU 602 of FIG. 6. In the embodiment of FIG. 7, MMU 602 includes a segmentation unit 700, a paging unit 702, and selection logic 704 for selecting between outputs of segmentation unit 700 and paging unit 702 to produce a physical address. As indicated in FIG. 7, segmentation unit 700 receives a segmented address from execution unit 600 and uses a well-know segmented-to-linear address translation mechanism of the x86 processor architecture to produce a corresponding linear address at an output. As indicated in FIG. 7, when enabled by a "PAGING" signal, paging unit 702 receives the linear addresses produced by segmentation unit 700 and produces corresponding physical addresses at an output. The PAGING signal may mirror the paging flag (PG) bit in a control register 0 (CR0) of the x86 processor architecture and of the set of control registers 608 (FIG. 6). When the PAGING signal is deasserted, memory paging is not enabled, and selection logic 704 produces the linear address received from segmentation unit 700 as the physical address.

When the PAGING signal is asserted, memory paging is enabled, and paging unit 702 translates the linear address received from segmentation unit 700 to a corresponding physical address using the above described linear-to-physical address translation mechanism 100 of the x86 processor architecture (FIG. 1). As described above, during the linear-to-physical address translation operation, the contents of the U/S bits of the selected page directory entry and the selected page table entry are logically ANDed determine if the access to a page frame is authorized. Similarly, the contents of the R/W bits of the selected page directory entry and the selected page table entry are logically ANDed to determine if the access to the page frame is authorized. If the logical combinations of the U/S and R/W bits indicate the access to the page frame is authorized, paging unit 702 produces the physical address resulting from the linear-to-physical address translation operation. Selection logic 704 receives the physical address produced by paging unit 702, produces the physical address received from paging unit 702 as the physical address, and provides the physical address to cache unit 604.

On the other hand, if the logical combinations of the U/S and R/W bits indicate the access to the page frame 108 is not authorized, paging unit 702 does not produce a physical address during the linear-to-physical address translation operation. Instead, paging unit 702 asserts a page fault signal, and MMU 602 forwards the page fault signal to execution unit 600. In the x86 processor architecture, a page fault signal may, in some cases, indicate a protection violation. In response to the page fault signal, execution unit 600 may execute an exception handler routine, and may ultimately halt the execution of one of the application programs 500 (FIG. 5) running when the page fault signal was asserted.

In the embodiment of FIG. 7, CPU SCU 416 is located within paging unit 702 of MMU 602. Paging unit 702 may also include a translation lookaside buffer (TLB) for storing a relatively small number of recently determined linear-to-physical address translations.

Figure 8:
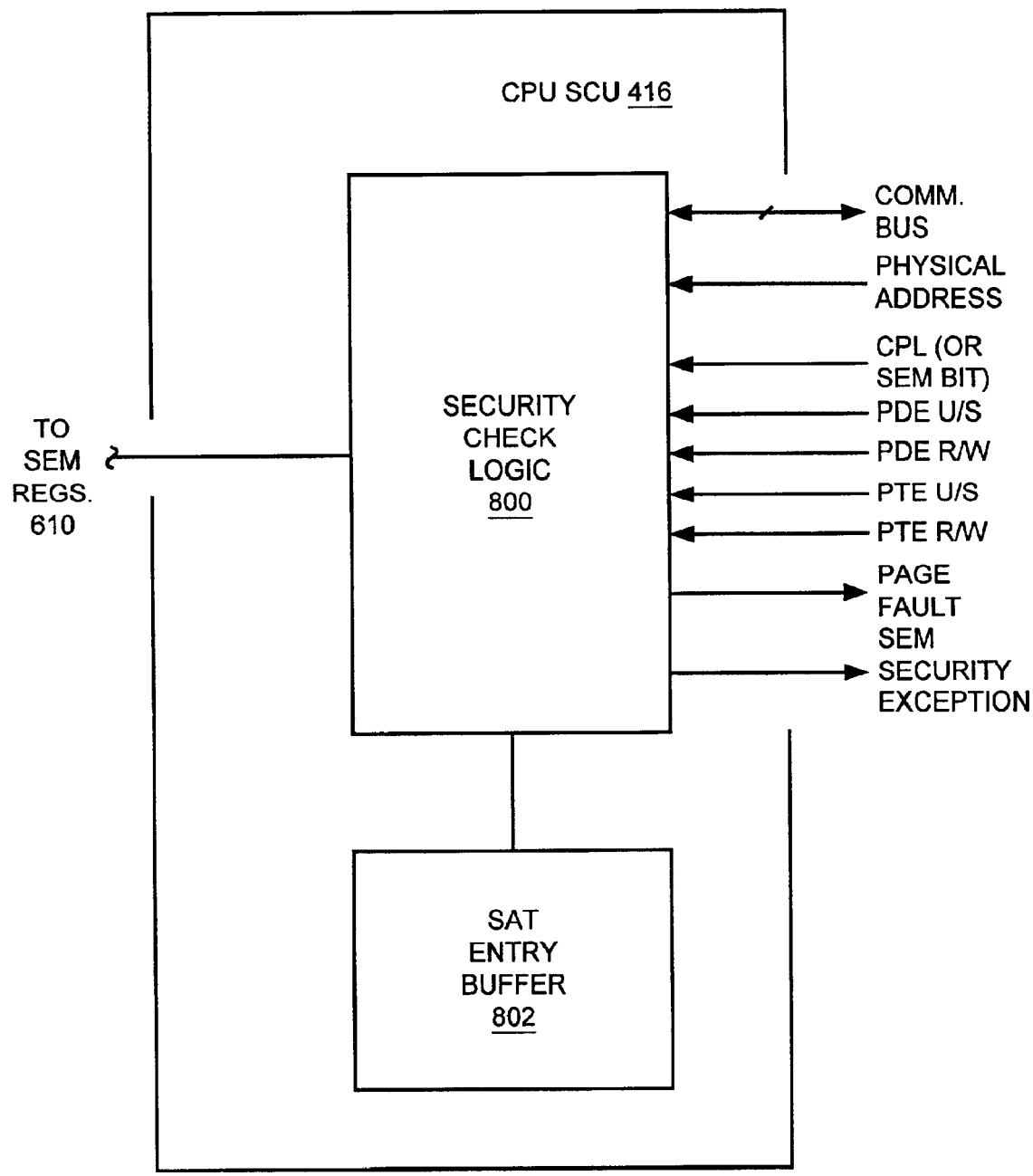
FIG. 8 is a diagram of one embodiment of the CPU SCU of FIG. 7.

FIG. 8 is a diagram of one embodiment of CPU SCU 416 of FIG. 7. In the embodiment of FIG. 8, CPU SCU 416 includes security check logic 800 coupled to the set of SEM registers 610 (FIG. 6) and a security attribute table (SAT) entry buffer 802. As described below, SAT entries include additional security information above the U/S and R/W bits of page directory and page table entries corresponding to memory pages. Security check logic 800 uses the additional security information stored within a given SAT entry to prevent unauthorized software-initiated accesses to the corresponding memory page. SAT entry buffer 802 is used to store a relatively small number of SAT entries of recently accessed memory pages.

As described above, the set of SEM registers 610 are used to implement a secure execution mode (SEM) within computer system 400 of FIG. 4. The contents of the set of SEM registers 610 govern the operation of CPU SCU 416. Security check logic 800 receives information to be stored in SAT entry buffer 802 from MMU 602 via a communication bus indicated in FIG. 8. The security check logic 800 also receives a physical address produced by paging unit 702.

Figure 9:
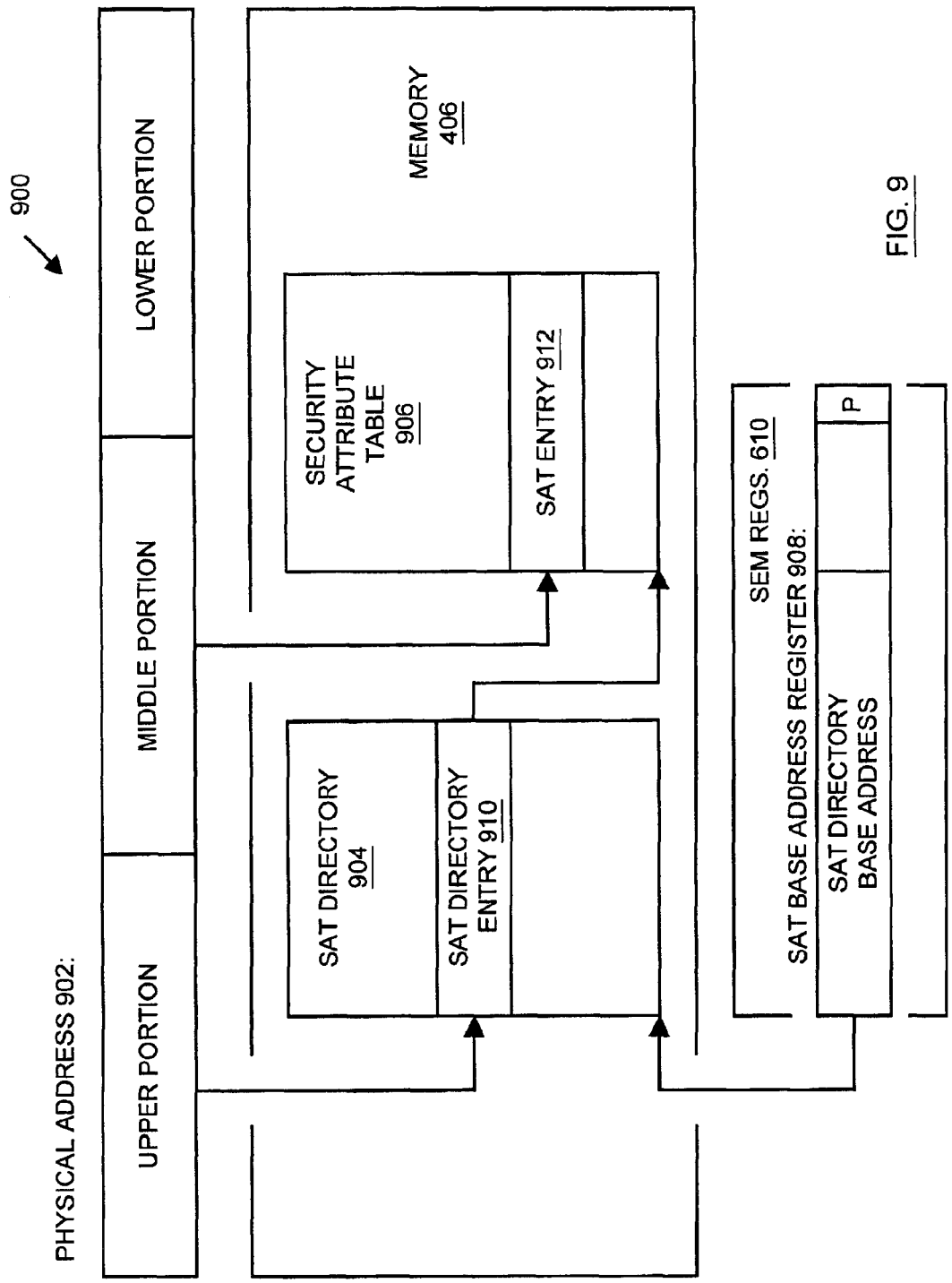
FIG. 9 is a diagram of one embodiment of a mechanism for accessing a security attribute table (SAT) entry of a selected memory page to obtain additional security information of the selected memory page.
Figure 10:
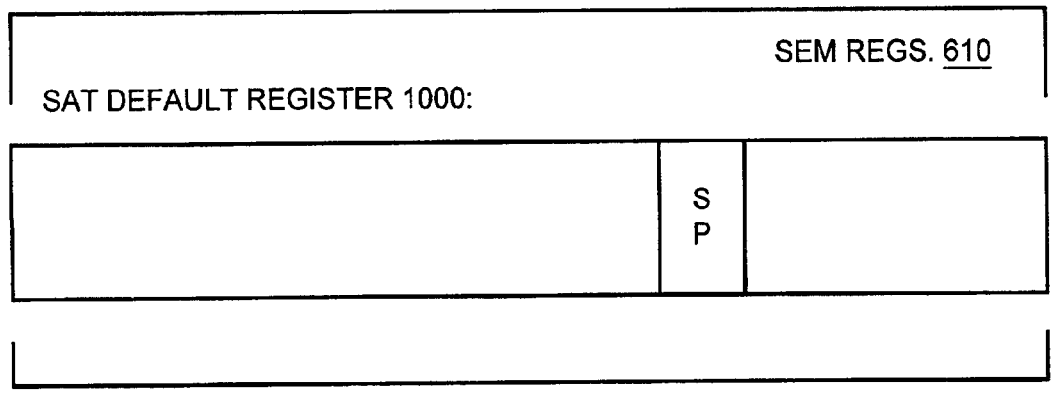
FIG. 10 is a diagram of one embodiment of a SAT default register.
Figure 11:
FIG. 11 is a diagram of one embodiment of a SAT directory entry format.

FIGS. 9–11 will now be used to describe how additional security information of memory pages selected using address translation mechanism 100 of FIG. 1 is obtained within computer system 400 of FIG. 4. FIG. 9 is a diagram of one embodiment of a mechanism 900 for accessing a SAT entry of a selected memory page to obtain additional security information of the selected memory page. Mechanism 900 of FIG. 9 may be embodied within security check logic 800 of FIG. 8, and may be implemented when computer system 400 of FIG. 4 is operating in the SEM. Mechanism 900 involves a physical address 902 produced by paging mechanism 702 (FIG. 7) using address translation mechanism 100 of FIG. 1, a SAT directory 904, multiple SATs including a SAT 906, and a SAT base address register 908 of the set of SEM registers 610. SAT directory 104 and the multiple SATs, including SAT 906, are SEM data structures created and maintained by security kernel 504 (FIG. 5). As described below, SAT directory 104 (when present) and any needed SAT is copied into memory 406 before being accessed.

SAT base address register 908 includes a present (P) bit which indicates the presence of a valid SAT directory base address within SAT base address register 908. The highest ordered (i.e., most significant) bits of SAT base address register 908 are reserved for the SAT directory base address. The SAT directory base address is a base address of a memory page containing SAT directory 904. If P=1, the SAT directory base address is valid, and SAT tables specify the security attributes of memory pages. If P=0, the SAT directory base address is not valid, no SAT tables exist, and security attributes of memory pages are determined by a SAT default register.

FIG. 10 is a diagram of one embodiment of the SAT default register 1000. In the embodiment of FIG. 10, SAT default register 1000 includes a secure page (SP) bit. The SP bit indicates whether or not all memory pages are secure pages. For example, if SP=0 all memory pages may not be secure pages, and if SP=1 all memory pages may be secure pages.

Referring back to FIG. 9 and assuming the P bit of SAT base address register 908 is a '1', physical address 902 produced by paging logic 702 (FIG. 7) is divided into three portions to access the SAT entry of the selected memory page. As described above, the SAT directory base address of SAT base address register 908 is the base address of the memory page containing SAT directory 904. SAT directory 904 includes multiple SAT directory entries, including a SAT directory entry 910. Each SAT directory entry may have a corresponding SAT in memory 406. An "upper" portion of physical address 902, including the highest ordered or most significant bits of physical address 902, is used as an index into SAT directory 904. SAT directory entry 910 is selected from within SAT directory 904 using the SAT directory base address of SAT base address register 908 and the upper portion of physical address 902.

FIG. 11 is a diagram of one embodiment of a SAT directory entry format 1100. In accordance with FIG. 11, each SAT directory entry includes a present (P) bit which indicates the presence of a valid SAT base address within the SAT directory entry. In the embodiment of FIG. 11, the highest ordered (i.e., the most significant) bits of each SAT directory entry are reserved for a SAT base address. The SAT base address is a base address of a memory page containing a corresponding SAT. If P=1, the SAT base address is valid, and the corresponding SAT is stored in memory 406.

If P=0, the SAT base address is not valid, and the corresponding SAT does not exist in memory 406 and must be copied into memory 406 from a storage device (e.g., a disk drive). If P=0, security check logic 800 may signal a page fault to logic within paging unit 702, and MMU 602 may forward the page fault signal to execution unit 600 (FIG. 6). In response to the page fault signal, execution unit 600 may execute a page fault handler routine which retrieves the needed SAT from the storage device and stores the needed SAT in memory 406. After the needed SAT is stored in memory 406, the P bit of the corresponding SAT directory entry is set to '1', and mechanism 900 is continued.

Figure 12:
FIG. 12 is a diagram of one embodiment of a SAT entry format.

Referring back to FIG. 9, a "middle" portion of physical address 902 is used as an index into SAT 906. SAT entry 906 is thus selected within SAT 906 using the SAT base address of SAT directory entry 910 and the middle portion of physical address 902. FIG. 12 is a diagram of one embodiment of a SAT entry format 1200. In the embodiment of FIG. 12, each SAT entry includes a secure page (SP) bit. The SP bit indicates whether or not the selected memory page is a secure page. For example, if SP=0 the selected memory page may not be a secure page, and if SP=1 the selected memory page may be a secure page.

BIU 606 (FIG. 6) retrieves needed SEM data structure entries from memory 406, and provides the SEM data structure entries to MMU 602. Referring back to FIG. 8, security check logic 800 receives SEM data structure entries from MMU 602 and paging unit 702 via the communication bus. As described above, SAT entry buffer 802 is used to store a relatively small number of SAT entries of recently accessed memory pages. Security check logic 800 stores a given SAT entry in SAT entry buffer 802, along with a "tag" portion of the corresponding physical address.

During a subsequent memory page access, security check logic 800 may compare a "tag" portion of a physical address produced by paging unit 702 to tag portions of physical addresses corresponding to SAT entries stored in SAT entry buffer 802. If the tag portion of the physical address matches a tag portion of a physical address corresponding to a SAT entry stored in SAT entry buffer 802, security check logic 800 may access the SAT entry in SAT entry buffer 802, eliminating the need to perform the process of FIG. 9 to obtain the SAT entry from memory 406. Security kernel 504

(FIG. 5) modifies the contents of SAT base address register 908 in CPU 402 (e.g., during context switches). In response to modifications of SAT base address register 908, security check logic 800 of CPU SCU 416 may flush SAT entry buffer 802.

When computer system 400 of FIG. 4 is operating in the SEM, security check logic 800 receives the current privilege level (CPL) of the currently executing task (i.e., the currently executing instruction). Alternately, security check logic 800 may receive the value of the secure execution mode (SEM) bit stored in the set of SEM registers 610 (FIG. 6). The CPL of the currently executing task, or the value of the secure execution mode (SEM) bit, represents a security attribute of the currently executing instruction. Security check logic 800 also receives the page directory entry (PDE) U/S bit, the PDE R/W bit, the page table entry (PTE) U/S bit, and the PTE R/W bit of a selected memory page within which a physical address resides. Security check logic 800 uses the above information, along with the SP bit of the SAT entry corresponding to the selected memory page, to determine if memory 406 access is authorized.

CPU 402 of FIG. 6 may be an x86 processor, and may include a code segment (CS) register, one of the 16-bit segment registers of the x86 processor architecture. Each segment register selects a 64k block of memory, called a segment. In the protected mode with paging enabled, the CS register is loaded with a segment selector that indicates an executable segment of memory 406. The highest ordered (i.e., most significant) bits of the segment selector are used to store information indicating a segment of memory including a next instruction to be executed by execution unit 600 of CPU 402 (FIG. 6). An instruction pointer (IP) register is used to store an offset into the segment indicated by the CS register. The CS:IP pair indicate a segmented address of the next instruction. The two lowest ordered (i.e., least significant) bits of the CS register are used to store a value indicating a current privilege level (CPL) of a task currently being executed by execution unit 600 (i.e., the CPL of the current task).

Table 1 below illustrates exemplary rules for CPU-initiated (i.e., software-initiated) memory accesses when computer system 400 of FIG. 4 is operating in the SEM, and security check logic 800 receives the current privilege level (CPL) of the currently executing task. CPU SCU 416 (FIGS. 4–8) and security kernel 504 (FIG. 5) would expectedly work together to implement the rules of Table 1 when computer system 400 of FIG. 4 is operating in the SEM to provide additional security for data stored in memory 406 above data security provided by operating system 502 (FIG. 5).

TABLE 1

Exemplary Rules For Software-Initiated Memory Accesses When Computer System 400 Of FIG. 4 Is Operating In The SEM.

| Currently Executing Instruction | | Selected Memory Page | | | Permitted | |
|---|---|---|---|---|---|---|
| SP | CPL | SP | U/S | R/W | Access | Remarks |
| 1 | 0 | X | X | 1(R/W) | R/W | Full access granted. (Typical accessed page contents: security kernel and SEM data structures.) |
| 1 | 0 | X | X | 0(R) | Read Only | Write attempt causes page fault; if selected memory page is a secure page (SP = 1), a SEM Security Exception is signaled instead of page fault. |
| 1 | 3 | 1 | 1(U) | 1 | R/W | Standard protection mechanisms apply. (Typical accessed page contents: high security applets.) |
| 1 | 3 | 1 | 0(S) | X | None | Access causes page fault. (Typical accessed page contents: security kernel and SEM data structures.) |
| 1 | 3 | 0 | 0 | 1 | None | Access causes page fault. (Typical accessed page contents: OS kernel and Ring 0 device drivers.) |
| 0 | 0 | 1 | X | X | None | Access causes SEM security exception. |
| 0 | 0 | 0 | 1 | 1 | R/W | Standard protection mechanisms apply. (Typical accessed page contents: high security applets.) |
| 0 | 3 | X | 0 | X | None | Access causes page fault; if selected memory page is a secure page (SP = 1), a SEM Security Exception is raised instead of page fault. |
| 0 | 3 | 0 | 1 | 1 | R/W | Standard protectibn mechanisms apply. (Typical accessed page contents: applications.) |

In Table 1 above, the SP bit of the currently executing instruction is the SP bit of the SAT entry corresponding to the memory page containing the currently executing instruction.

The U/S bit of the selected memory page is the logical AND of the PDE U/S bit and the PTE U/S bit of the selected memory page. The R/W bit of the selected memory page is the logical AND of the PDE R/W bit and the PTE R/W bit of the selected memory page. The symbol "X" signifies a "don't care": the logical value may be either a '0'or a '1'.

It is noted that, as shown in FIG. 8 and described above, security check logic 800 may receive the value of the secure execution mode (SEM) bit, stored in the set of SEM registers 610 of FIG. 6, in place of the CPL of the currently executing task. In this situation, the security check logic 800 may generate the page fault signal dependent upon the value of the SEM bit.

Referring back to FIG. 8, security check logic 800 of CPU SCU 416 produces a page fault signal and a "SEM SECURITY EXCEPTION" signal, and provides the page fault and the SEM SECURITY EXCEPTION signals to logic within paging unit 702. When security check logic 800 asserts the page fault signal, MMU 602 forwards the page fault signal to execution unit 600 (FIG. 6). In response to the page fault signal, execution unit 600 may use the well-known interrupt descriptor table (IDT) vectoring mechanism of the x86 processor architecture to access and execute a page fault handler routine.

When security check logic 800 asserts the SEM SECURITY EXCEPTION signal, MMU 602 forwards the SEM SECURITY EXCEPTION signal to execution unit 600. Unlike normal processor exceptions which use the use the IDT vectoring mechanism of the x86 processor architecture, a different vectoring method may be used to handle SEM security exceptions. SEM security exceptions may be dispatched through a pair of registers (e.g., model specific registers or MSRs) similar to the way x86 "SYSENTER" and "SYSEXIT" instructions operate. The pair of registers may be "security exception entry point" registers, and may define a branch target address for instruction execution when a SEM security exception occurs. The security exception entry point registers may define the code segment (CS), then instruction pointer (IP, or the 64-bit version RIP), stack segment (SS), and the stack pointer (SP, or the 64-bit version RSP) values to be used on entry to a SEM security exception handler. Under software control, execution unit 600 (FIG. 6) may push the previous SS, SP/RSP, EFLAGS, CS, and IP/RIP values onto a new stack to indicate where the exception occurred. In addition, execution unit 600 may push an error code onto the stack. It is noted that a normal return from interrupt (IRET) instruction may not be used as the previous SS and SP/RSP values are always saved, and a stack switch is always accomplished, even if a change in CPL does not occur. Accordingly, a new instruction may be defined to accomplish a return from the SEM security exception handler.

Figure 13:
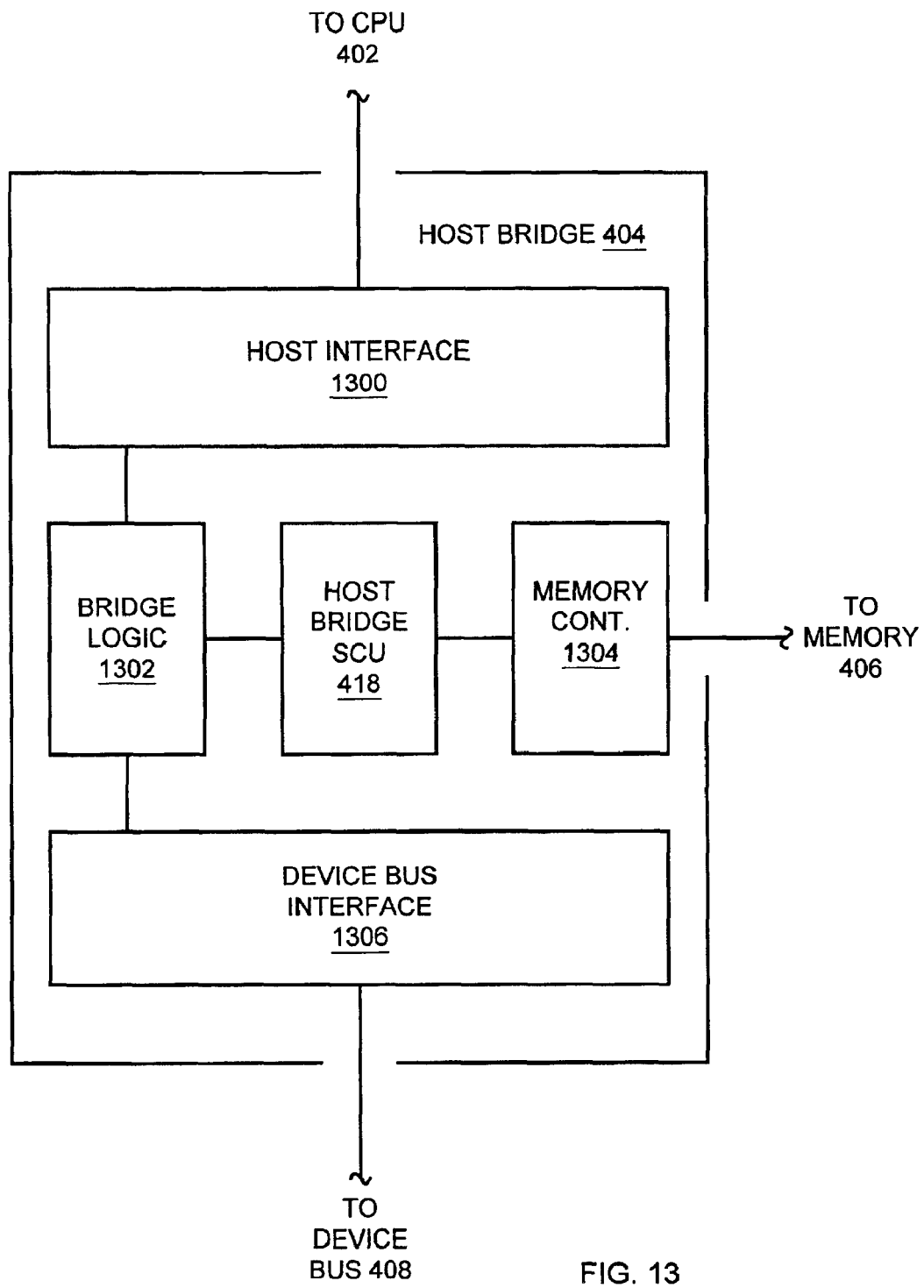
FIG. 13 is a diagram of one embodiment of the host bridge of FIG. 4, wherein the host bridge includes the host bridge SCU.

FIG. 13 is a diagram of one embodiment of host bridge 404 of FIG. 4. In the embodiment of FIG. 13, host bridge 404 includes a host interface 1300, bridge logic 1302, host bridge SCU 418, a memory controller 1304, and a device bus interface 1306. Host interface 1300 is coupled to CPU 402, and device bus interface 1306 is coupled to device bus 408. Bridge logic 1302 is coupled between host interface 1300 and device bus interface 1306. Memory controller 1304 is coupled to memory 406, and performs all accesses to memory 406. Host bridge SCU 418 is coupled between bridge logic 1302 and memory controller 1304. As described above, host bridge SCU 418 controls access to memory 406 via device bus interface 1306. Host bridge SCU 418 monitors all accesses to memory 406 via device bus interface 1306, and allows only authorized accesses to memory 406.

Figure 14:
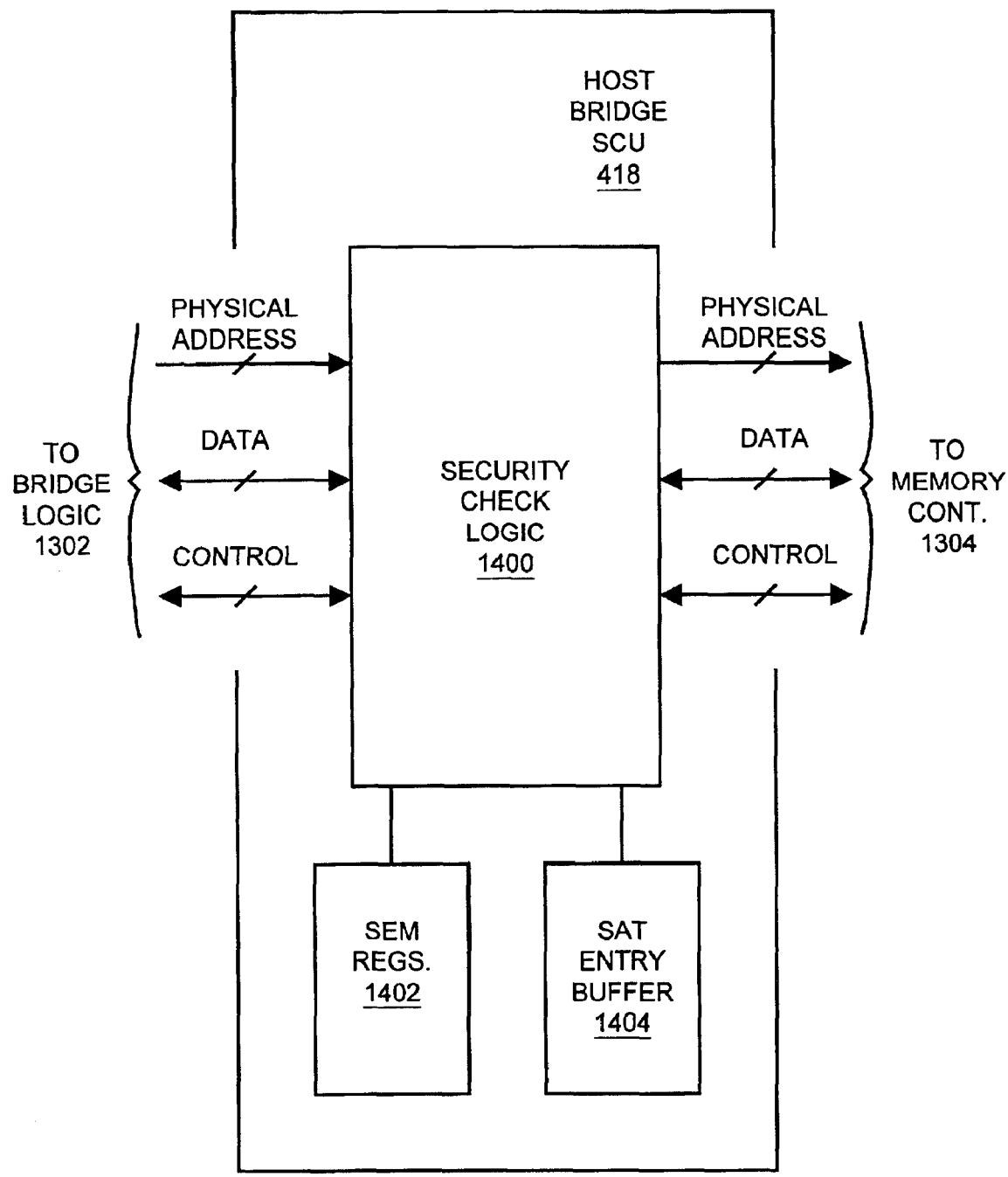
FIG. 14 is a diagram of one embodiment of the host bridge SCU of FIG. 13.

FIG. 14 is a diagram of one embodiment of host bridge SCU 418 of FIG. 13. In the embodiment of FIG. 14, host bridge SCU 418 includes security check logic 1400 coupled to a set of SEM registers 1402 and a SAT entry buffer 1404. The set of SEM registers 1402 govern the operation of security check logic 1400, and includes a second SAT base address register 908 of FIG. 9. The second SAT base address register 908 of the set of SEM registers 1402 may be an addressable register. When security kernel 504 (FIG. 5) modifies the contents of SAT base address register 908 in the set of SEM registers 610 of CPU 402 (e.g., during a context switch), security kernel 504 may also write the same value to the second SAT base address register 908 in the set of SEM registers 1402 of host bridge SCU 418. In response to modifications of the second SAT base address register 908, security check logic 1400 of host bridge SCU 418 may flush SAT entry buffer 1404.

Security check logic 1400 receives memory access signals of memory accesses initiated by hardware device units 414A–414D (FIG. 4) via device bus interface 1306 and bridge logic 1302 (FIG. 13). The memory access signals convey physical addresses from hardware device units 414A–414D, and associated control and/or data signals. Security check logic 1400 may embody mechanism 900 (FIG. 9) for obtaining SAT entries of corresponding memory pages, and may implement mechanism 900 when computer system 400 of FIG. 4 is operating in the SEM. SAT entry buffer 1404 is similar to SAT entry buffer 802 of CPU SCU 416 (FIG. 8) described above, and is used to store a relatively small number of SAT entries of recently accessed memory pages.

When computer system 400 of FIG. 4 is operating in SEM, security check logic 1400 of FIG. 14 uses additional security information of a SAT entry associated with a selected memory page to determine if a given hardware-initiated memory access is authorized. If the given hardware-initiated memory access is authorized, security check logic 1400 provides the memory access signals (i.e., address signals conveying a physical address and the associated control and/or data signals) of the memory access to memory controller 1304. Memory controller 1304 uses the physical address and the associated control and/or data signals to access memory 406. If memory 406 access is a write access, data conveyed by the data signals is written to memory 406. If memory 406 access is a read access, memory controller 1304 reads data from memory 406, and provides the resulting read data to security check logic 1400. Security check logic 1400 forwards the read data to bridge logic 1302, and bridge logic 1302 provides the data to device bus interface 1306.

If, on the other hand, the given hardware-initiated memory access is not authorized, security check logic 1400 does not provide the physical address and the associated control and/or data signals of memory 406 accesses to memory controller 1304. If the unauthorized hardware-initiated memory access is a memory write access, security check logic 1400 may signal completion of the write access and discard the write data, leaving memory 406 unchanged. Security check logic 1400 may also create a log entry in a log (e.g., set or clear one or more bits of a status register) to document the security access violation. Security kernel 504 may periodically access the log to check for such log entries. If the unauthorized hardware-initiated memory access is a memory read access, security check logic 1400 may return a false result (e.g., all "F"s) to device bus interface 1306 via bridge logic 1302 as the read data. Security check logic 1400 may also create a log entry as described above to document the security access violation.

Figure 15:
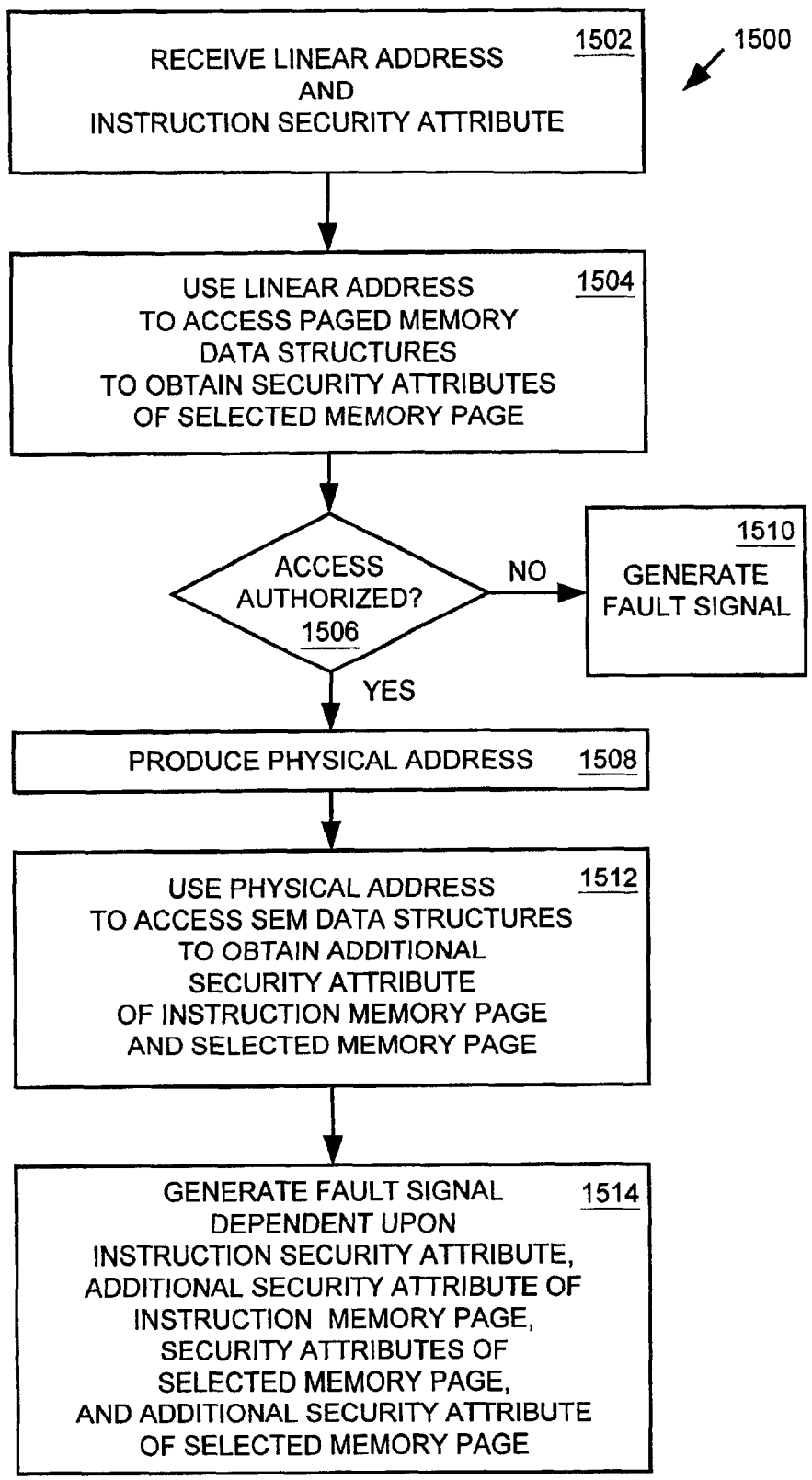
FIG. 15 is a flow chart of one embodiment of a first method for managing a memory used to store data arranged within multiple memory pages.

FIG. 15 is a flow chart of one embodiment of a method 1500 for providing access security for a memory used to store data arranged within multiple memory pages. Method 1500 reflects the exemplary rules of Table 1 for CPU-initiated (i.e., software-initiated) memory accesses when computer system 400 of FIG. 4 is operating in the SEM. Method 1500 may be embodied within MMU 602 (FIGS. 6–7). During a step 1502 of method 1500, a linear address produced during execution of an instruction is received, along with a security attribute of the instruction (e.g., a CPL of a task including the instruction, or a value of the SEM bit stored in the set of SEM registers 610 of FIG. 6). The instruction resides in a memory page. During a step 1504, the linear address is used to access at least one paged memory data structure located in the memory (e.g., a page directory and a page table) to obtain a base address of a selected memory page and security attributes of the selected memory page. The security attributes of the selected memory page may include, for example, a U/S bit and a R/W bit of a page directory entry and a U/S bit and a R/W bit of a page table entry.

During a decision step 1506, the security attribute of the instruction and the security attributes of the selected memory page are used to determine whether or not the access is authorized. If the access is authorized, the base address of the selected memory page and an offset are combined during a step 1508 to produce a physical address within the selected memory page. If the access is not authorized, a fault signal (e.g., a page fault signal) is generated during a step 1510.

During a step 1512 following step 1508, at least one security attribute data structure located in the memory (e.g., SAT directory 904 of FIG. 9 and a SAT) is accessed using the physical address of the selected memory page to obtain an additional security attribute of the first memory page and an additional security attribute of the selected memory page. The additional security attribute of the first memory page may include, for example, a secure page (SP) bit as described above, wherein the SP bit indicates whether or not the first memory page is a secure page. Similarly, the additional security attribute of the selected memory page may include a secure page (SP) bit, wherein the SP bit indicates whether or not the selected memory page is a secure page.

The fault signal is generated during a step 1514 dependent upon the security attribute of the instruction, the additional security attribute of the first memory page, the security attributes of the selected memory page, and the additional security attribute of the selected memory page. It is noted that steps 1512 and 1514 of method 1500 may be embodied within CPU SCU 416 (FIGS. 4–8).

Table 2 below illustrates exemplary rules for memory page accesses initiated by device hardware units 414A–414D (i.e., hardware-initiated memory accesses) when computer system 400 of FIG. 4 is operating in the SEM. Such hardware-initiated memory accesses may be initiated by bus mastering circuitry within device hardware units 414A–414D, or by DMA devices at the request of device hardware units 414A–414D. Security check logic 1400 may implement the rules of Table 2 when computer system 400 of FIG. 4 is operating in the SEM to provide additional security for data stored in memory 406 above data security provided by operating system 502 (FIG. 5). In Table 2 below, the "target" memory page is the memory page within which a physical address conveyed by memory access signals of a memory access resides.

TABLE 2

Exemplary Rules For Hardware-Initiated Memory Accesses When Computer system 400 Of FIG. 4 Is Operating In The SEM.

| Particular Memory Page SP | Access Type | Action |
| --- | --- | --- |
| 0 | R/W | The access completes as normal. |
| 1 | Read | The access is completed returning all "F"s instead of actual memory contents. The unauthorized access may be logged. |
| 1 | Write | The access is completed but write data is discarded. Memory contents remain unchanged. The unauthorized access may be logged. |

In Table 2 above, the SP bit of the target memory page is obtained by host bridge SCU 418 using the physical address of the memory access and the above described mechanism 900 of FIG. 9 for obtaining SAT entries of corresponding memory pages.

Figure 2:
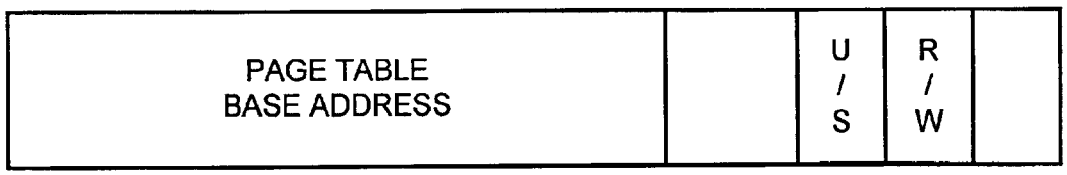
FIG. 2 is a diagram of a page directory entry format of the x86 processor architecture.
Figure 3:
FIG. 3 is a diagram of a page table entry format of the x86 processor architecture.

As indicated in FIG. 2, when SP=1 indicating the target memory page is a secure page, the memory access is unauthorized. In this situation, security check logic 1400 (FIG. 14) does not provide the memory access signals to the memory controller. A portion of the memory access signals (e.g., the control signals) indicate a memory access type, and wherein the memory access type is either a read access or a write access. When SP=1 and the memory access signals indicate the memory access type is a read access, the memory access is an unauthorized read access, and security check logic 1400 responds to the unauthorized read access by providing all "F"s instead of actual memory contents (i.e., bogus read data). Security check logic 1400 may also respond to the unauthorized read access by logging the unauthorized read access as described above.

When SP=1 and the memory access signals indicate the memory access type is a write access, the memory access is an unauthorized write access. In this situation, security check logic 1400 responds to the unauthorized write access by discarding write data conveyed by the memory access signals. Security check logic 1400 may also respond to the unauthorized write access by logging the unauthorized write access as described above.

Figure 16:
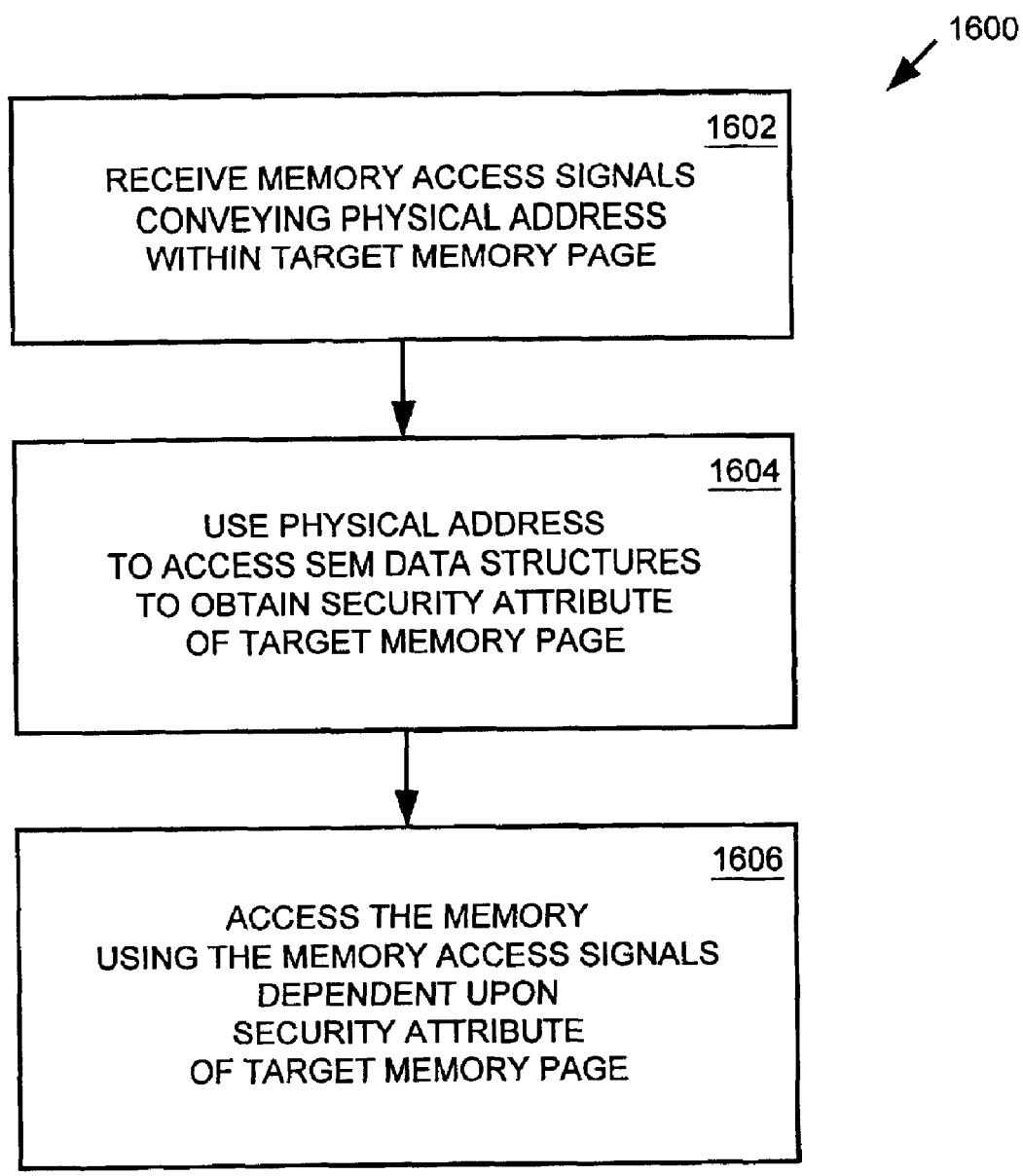
FIG. 16 is a flow chart of one embodiment of a second method for providing access security for a memory used to store data arranged within multiple memory pages.

FIG. 16 is a flow chart of one embodiment of a method 1600 for providing access security for a memory used to store data arranged within multiple memory pages. Method 1600 reflects the exemplary rules of Table 2 for hardware-initiated memory accesses when computer system 400 of FIG. 4 is operating in the SEM. Method 1600 may be embodied within host bridge 404 (FIGS. 4 and 13–14). During a step 1602 of method 1600, memory access signals of a memory access are received, wherein the memory access signals convey a physical address within a target memory page. As described above, the memory access signals may be produced by a device hardware unit. The physical address is used to access at least one security attribute data structure located in the memory to obtain a security attribute of the target memory page during a step 1604. The at least one security attribute data structure may include, for example, a SAT directory (e.g., SAT directory 904 in FIG. 9) and at least one SAT (e.g., SAT 906 in FIG. 9), and the additional security attribute of the target memory page may include a secure page (SP) bit as described above which indicates whether or not the target memory page is a secure page. During a step 1606, the memory is accessed using the memory access signals dependent upon the security attribute of the target memory page.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A memory management unit for managing a memory storing data arranged within a plurality of memory pages, the memory management unit comprising:

a security check unit coupled to receive a physical address within a selected memory page and security attributes of the selected memory page, and wherein the security check unit is configured to use the physical address to access at least one security attribute data structure located in the memory to obtain an additional security attribute of the selected memory page, and to generate a fault signal dependent upon the security attributes of selected memory page and the additional security attribute of the selected memory page.

2. The memory management unit as recited in claim 1, wherein the security attributes of the selected memory page comprise a user/supervisor (U/S) bit and a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

3. The memory management unit as recited in claim 1, wherein the at least one security attribute data structure comprises a security attribute table directory and at least one security attribute table.

4. The memory management unit as recited in claim 3, wherein the security attribute table directory comprises a plurality of entries, and where each entry of the security attribute table directory includes a present bit and a security attribute table base address field, and wherein the present bit indicates whether or not a security attribute table corresponding to the security attribute table directory entry is present in the memory, and wherein the security attribute table base address field is reserved for a base address of the security attribute table corresponding to the security attribute table directory entry.

5. The memory management unit as recited in claim 3, wherein the at least one security attribute table comprises a plurality of entries, and where each entry of the security attribute table includes a secure page (SP) bit, and wherein the SP bit indicates whether or not a corresponding memory page is a secure page.

6. The memory management unit as recited in claim 1, wherein the additional security attribute of the selected memory page comprises a secure page (SP) bit, and wherein the SP bit indicates whether or not the selected memory page is a secure page.

7. The memory management unit as recited in claim 1, wherein an linear address is produced during execution of an instruction residing within a first memory page, and wherein the security check unit is coupled to receive a current privilege level (CPL) of a task including an instruction, and wherein the security check unit is configured obtain an additional security attribute of a first memory page from the at least one security attribute data structure, and wherein the security check unit is configured to generate the fault signal dependent upon the CPL of the task including the instruction, the additional security attribute of the first memory page, the security attributes of the selected memory page, and the additional security attribute of the selected memory page.

8. The memory management unit as recited in claim 7, wherein the additional security attribute of the first memory page comprises a secure page (SP) bit, and wherein the SP bit indicates whether or not the first memory page is a secure page.

9. The memory management unit as recited in claim 1, wherein an linear address is produced during execution of an instruction residing within a first memory page, and wherein the security check unit is coupled to receive a value of a secure execution mode (SEM) bit indicative of operation in a secure execution mode, and wherein the security check unit is configured obtain an additional security attribute of the first memory page from the at least one security attribute data structure, and wherein the security check logic is configured to generate the fault signal dependent upon the value of the SEM bit, the additional security attribute of the first memory page, the security attributes of the selected memory page, and the additional security attribute of the selected memory page.

10. The memory management unit as recited in claim 1, wherein the fault signal is a page fault signal as defined by the x86 processor architecture.

11. A central processing unit, comprising:
an execution unit operably coupled to a memory, wherein the execution unit is configured to fetch instructions from the memory and to execute: the instructions; and
a memory management unit (MMU) operably coupled to the memory and configured to manage the memory, wherein the MMU is configurable to manage the memory such that the memory stores data arranged within a plurality of memory pages, and wherein the MMU comprises:
a security check unit coupled to receive a physical address within a selected memory page and security attributes of the selected memory page, and wherein the security check unit is configured to use the physical address to access at least one security attribute data structure located in the memory to obtain an additional security attribute of the selected memory page, and to generate a fault signal dependent upon the security attributes of selected memory page and the additional security attribute of the selected memory page.

12. A computer system, comprising:
a memory for storing data, wherein the data includes instructions;
a central processing unit (CPU), comprising:
an execution unit operably coupled to the memory, wherein the execution unit is configured to fetch instructions from the memory and to execute the instructions; and
a memory management unit (MMU) operably coupled to the memory and configured to manage the memory, wherein the MMU is configurable to manage the memory such that the memory stores the data arranged within a plurality of memory pages, and wherein the MMU comprises:
a security check unit coupled to receive a physical address within a selected memory page and security attributes of the selected memory page, and wherein the security check unit is configured to use the physical address to access at least one security attribute data structure located in the memory to obtain an additional security attribute of the selected memory page, and to generate a fault signal dependent upon the security attributes of selected memory page and the additional security attribute of the selected memory page.

13. A memory management unit for managing a memory storing data arranged within a plurality of memory pages, the memory management unit comprising:
a paging unit coupled to the memory and to receive a linear address and configured to use the linear address to produce a physical address within a selected memory page, wherein the paging unit is configured use the linear address to access at least one paged memory data structure located in the memory to obtain security attributes of the selected memory page, and wherein the paging unit is configured to produce a fault signal dependent upon the security attributes of the selected memory page; and wherein the paging unit comprises a security check unit coupled to receive the physical address and the security attributes of the selected memory page, and wherein the security check unit is configured to use the physical address of the selected memory page to access at least one security attribute data structure located in the memory to obtain an additional security attribute of the selected memory page, and to generate the fault signal dependent upon the security attributes of selected memory page and the additional security attribute of the selected memory page.

14. The memory management unit as recited in claim 13, wherein the paging unit produces the physical address of the selected memory page during execution of an instruction residing within a first memory page.

15. The memory management unit as recited in claim 13, wherein the physical address within the selected memory page includes a base address and an offset.

16. The memory management unit as recited in claim 15, wherein the paging unit is configured to obtain the base address from the at least one paged memory data structure.

17. The memory management unit as recited in claim 13, wherein the at least one paged memory data structure comprises a page directory and at least one page table as defined by the x86 processor architecture.

18. The memory management unit as recited in claim 13, wherein the security attributes of the selected memory page comprise a user/supervisor (U/S) bit and a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

19. The memory management unit as recited in claim 14, wherein the paging unit is configured to receive security attribute of the instruction and to produce the fault signal dependent upon the security attribute of the instruction and the security attributes of the selected memory page.

20. The memory management unit as recited in claim 19, wherein the security attribute of the instruction comprises a current privilege level (CPL) of a task including the instruction as defined by the x86 processor architecture.

21. The memory management unit as recited in claim 19, wherein the security attribute of the instruction comprises a value of a secure execution mode (SEM) bit indicative of operation in a secure execution mode.

22. The memory management unit as recited in claim 13, wherein the at least one security attribute data structure comprises a security attribute table directory and at least one security attribute table.

23. The memory management unit as recited in claim 22, wherein the security attribute table directory comprises a plurality of entries, and where each entry of the security attribute table directory includes a present bit and a security attribute table base address field, and wherein the present bit indicates whether or not a security attribute table corresponding to the security attribute table directory entry is present in the memory, and wherein the security attribute table base address field is reserved for a base address of the security attribute table corresponding to the security attribute table directory entry.

24. The memory management unit as recited in claim 22, wherein the at least one security attribute table comprises a plurality of entries, and where each entry of the security attribute table includes a secure page (SP) bit, and wherein the SP bit indicates whether or not a corresponding memory page is a secure page.

25. The memory management unit as recited in claim 24, wherein the additional security attribute of the selected memory page comprises a secure page (SP) bit, and wherein the SP bit indicates whether or not the selected memory page is a secure page.

26. The memory management unit as recited in claim 20, wherein the security check unit is coupled to receive the CPL of the task including the instruction, and wherein the security check unit is configured obtain an additional security attribute of the first memory page including the instruction from the at least one security attribute data structure, and wherein the security check unit is configured to generate the fault signal dependent upon the CPL of the task including the instruction, the additional security attribute of the first memory page including the instruction, the security attributes of the selected memory page, and the additional security attribute of the selected memory page.

27. The memory management unit as recited in claim 26, wherein the additional security attribute of the first memory page comprises a secure page (SP) bit, and wherein the SP bit indicates whether or not the first memory page is a secure page.

28. The memory management unit as recited in claim 21, wherein the security check unit is coupled to receive the value of the SEM bit, and wherein the security check logic is configured obtain an additional security attribute of the first memory page including the instruction from the at least one security attribute data structure, and wherein the security check unit is configured to generate the fault signal dependent upon the value of the SEM bit, the additional security attribute of the first memory page including the instruction, the security attributes of the selected memory page, and the additional security attribute of the selected memory page.

29. The memory management unit as recited in claim 13, wherein the fault signal is a page fault signal as defined by the x86 processor architecture.

30. A memory management unit for managing a memory storing data arranged within a plurality of memory pages, the memory management unit comprising:

a paging unit coupled to the memory and to receive a linear address produced during execution of an instruction residing within a first memory page, wherein the paging unit is configured to use the linear address to produce a physical address accessed by the instruction, and wherein the physical address includes a base address of a selected memory page and an offset, and wherein the paging unit is configured to access at least one paged memory data structure located in the memory using the linear address to obtain the base address and security attributes of the selected memory page, and wherein the paging unit is configured to receive security attribute of the instruction, and wherein the paging unit is configured to produce a fault signal dependent upon the security attribute of the instruction and the security attributes of the selected memory page; and wherein the paging unit comprises a security check unit coupled to receive the security attribute of the instruction, the security attributes of the selected memory page, and the physical address within the selected memory page, and wherein the security check unit is configured to access at least one security attribute data structure located in the memory using the physical address of the selected memory page to obtain an additional security attribute of the first memory page and an additional security attribute of the selected memory page, and to generate the fault signal dependent upon the security attribute of the instruction, the additional security attribute of the first memory page, the security attributes of the selected memory page, and the additional security attribute of the selected memory page.

31. The memory management unit as recited in claim 30, wherein the at least one paged memory data structure comprises a page directory and at least one page table as defined by the x86 processor architecture.

32. The memory management unit as recited in claim 30, wherein the security attribute of the instruction comprises a current privilege level (CPL) of a task including the instruction as defined by the x86 processor architecture.

33. The memory management unit as recited in claim 30, wherein the security attribute of the instruction comprises a value of a secure execution mode (SEM) bit indicative of operation in a secure execution mode.

34. The memory management unit as recited in claim 30, wherein the security attributes of the selected memory page comprise a user/supervisor (U/S) bit a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

35. The memory management unit as recited in claim 30, wherein the fault signal is a page fault signal as defined by the x86 processor architecture.

36. The memory management unit as recited in claim 30, wherein the additional security attribute of the first memory page comprises a secure page (SP) bit, and wherein the SP bit indicates whether or not the first memory page is a secure page.

37. The memory management unit as recited in claim 30, wherein the additional security attribute of the selected memory page comprises a secure page (SP) bit, and wherein the SP bit indicates whether or not the selected memory page is a secure page.

38. The memory management unit as recited in claim 30, wherein the at least one security attribute data structure comprises a security attribute table directory and at least one security attribute table.

39. The memory management unit as recited in claim 38, wherein the security attribute table directory comprises a plurality of entries, and where each entry of the security attribute table directory includes a present bit and a security attribute table base address field, and wherein the present bit indicates whether or not a security attribute table corresponding to the security attribute table directory entry is present in the memory, and wherein the security attribute table base address field is reserved for a base address of the security attribute table corresponding to the security attribute table directory entry.

40. The memory management unit as recited in claim 38, wherein the at least one security attribute table comprises a plurality of entries, and where each entry of the security attribute table includes a secure page (SP) bit, and wherein the SP bit indicates whether or not a corresponding memory page is a secure page.

41. A method for providing access security for a memory used to store data arranged within a plurality of memory pages, the method comprising:
  receiving a linear address produced during execution of an instruction and a security attribute of the instruction, wherein the instruction resides in a first memory page;
  using the linear address to access at least one paged memory data structure located in the memory to obtain a base address of a selected memory page and security attributes of the selected memory page;
  combining the base address of the selected memory page with an offset to produce a physical address within the selected memory page if the security attribute of the instruction and the security attributes of the selected memory page indicate the access is authorized;
  generating a fault signal if the security attribute of the instruction and the security attributes of the selected memory page indicate the access is not authorized;
  accessing at least one security attribute data structure located in the memory using the physical address of the selected memory page to obtain an additional security attribute of the first memory page and an additional security attribute of the selected memory page; and
  generating the fault signal dependent upon the security attribute of the instruction, the additional security attribute of the first memory page, the security attributes of the selected memory page, and the additional security attribute of the selected memory page.

42. The method as recited in claim 41, wherein the using comprises:
  using the linear address to access at least one paged memory data structure located in the memory to obtain a base address of a selected memory page and security attributes of the selected memory page, wherein the at least one paged memory data structure comprises a page directory and at least one page table as defined by the x86 processor architecture.

43. The method as recited in claim 41, wherein the receiving comprises:
  receiving a linear address produced during execution of an instruction and a security attribute of the instruction, wherein the instruction resides in a first memory page, and wherein the security attribute of the instruction comprises a current privilege level (CPL) of a task including the instruction as defined by the x86 processor architecture.

44. The method as recited in claim 41, wherein the receiving comprises:
  receiving a linear address produced during execution of an instruction and a security attribute of the instruction, wherein the instruction resides in a first memory page, and wherein the security attribute of the instruction comprises a value of a secure execution mode (SEM) bit indicative of operation in a secure execution mode.

45. The method as recited in claim 41, wherein the using comprises:
  using the linear address to access at least one paged memory data structure located in the memory to obtain a base address of a selected memory page and security attributes of the selected memory page, wherein the security attributes of the selected memory page comprise a user/supervisor (U/S) bit a read/write (R/W) bit as defined by the x86 processor architecture, and wherein U/S=0 indicates the selected memory page is an operating system memory page and corresponds to a supervisor level of the operating system, and wherein U/S=1 indicates the selected memory page is a user memory page and corresponds to a user level of the operating system, and wherein R/W=0 indicates only read accesses are allowed to the selected memory page, and wherein R/W=1 indicates that both read and write accesses are allowed to the selected memory page.

46. The method as recited in claim 41, wherein the generating comprises:

generating the fault signal dependent upon the security attribute of the instruction, the additional security attribute of the first memory page, the security attributes of the selected memory page, and the additional security attribute of the selected memory page, wherein the fault signal is a page fault signal as defined by the x86 processor architecture.

47. The method as recited in claim 41, wherein the accessing comprises:

accessing at least one security attribute data structure located in the memory using the physical address of the selected memory page to obtain an additional security attribute of the first memory page and an additional security attribute of the selected memory page, wherein the additional security attribute of the first memory page comprises a secure page (SP) bit, and wherein the SP bit indicates whether or not the first memory page is a secure page.

48. The method as recited in claim 41, wherein the accessing comprises:

accessing at least one security attribute data structure located in the memory using the physical address of the selected memory page to obtain an additional security attribute of the first memory page and an additional security attribute of the selected memory page, wherein the additional security attribute of the selected memory page comprises a secure page (SP) bit, and wherein the SP bit indicates whether or not the selected memory page is a secure page.

49. The method as recited in claim 41, wherein the using comprises:

using the linear address to access at least one paged memory data structure located in the memory to obtain a base address of a selected memory page and security attributes of the selected memory page, wherein the at least one security attribute data structure comprises a security attribute table directory and at least one security attribute table.

* * * * *